(12) United States Patent
Lidsky

(10) Patent No.: US 11,700,249 B2
(45) Date of Patent: Jul. 11, 2023

(54) SYSTEMS AND METHODS FOR USER AUTHENTICATION BASED ON A GENETIC SEQUENCE

(71) Applicant: Ofer A. Lidsky, Ramat-Gan (IL)

(72) Inventor: Ofer A. Lidsky, Ramat-Gan (IL)

( * ) Notice: Subject to any disclaimer, the term of this patent is extended or adjusted under 35 U.S.C. 154(b) by 37 days.

(21) Appl. No.: 15/930,608

(22) Filed: May 13, 2020

(65) Prior Publication Data

US 2020/0296091 A1  Sep. 17, 2020

Related U.S. Application Data

(63) Continuation of application No. 16/114,339, filed on Aug. 28, 2018, now Pat. No. 10,673,847.

(51) Int. Cl.
*H04L 9/40* (2022.01)
*H04L 9/08* (2006.01)
(Continued)

(52) U.S. Cl.
CPC .......... *H04L 63/0861* (2013.01); *G06F 21/32* (2013.01); *G06F 21/335* (2013.01); *G06Q 20/3674* (2013.01); *G06Q 20/40145* (2013.01); *H04L 9/0866* (2013.01); *H04L 9/3236* (2013.01); *H04L 63/083* (2013.01);
(Continued)

(58) Field of Classification Search
CPC . H04L 63/0861; H04L 63/102; H04L 63/083; H04L 9/0866; H04L 9/3236; H04L 2209/38; G06Q 20/40145; G06Q 20/3674
See application file for complete search history.

(56) References Cited

U.S. PATENT DOCUMENTS 7,297,490 B2  11/2007  Kwan et al.
9,374,370 B1   6/2016  Bent, II et al.
(Continued)

FOREIGN PATENT DOCUMENTS

WO   WO 2017/112019   6/2017

OTHER PUBLICATIONS

Gao, Z., Xu, L., Turner, G., Patel, B., Diallo, N., Chen, L. and Shi, W., Jun. 2018. Blockchain-based identity management with mobile device. In Proceedings of the 1st Workshop on Cryptocurrencies and Blockchains for Distributed Systems (pp. 66-70). (Year: 2018).*

(Continued)

*Primary Examiner* — Robert B Leung

(57) ABSTRACT

There is provided a system for creating a cryptographic non-fungible identity unique token (IUT), comprising code for: obtaining a private key linked to a public address of an electronic wallet, associated with a wallet address, obtaining a digital representation of a hashed genetic sequence of a user and an associated wallet address of the electronic wallet, storing in the cryptographic non-fungible IUT, an IUT identifier, the IUT identifier is an outcome of hashing a subset of the hashed digital representation and a unique password, storing the IUT in a genetic sequence record stored in a block of a blockchain dataset, wherein the genetic sequence record is associated with the IUT, the IUT is associated to the wallet address, wherein the user is authenticated by a match between a computed value of a password and the wallet address provided by the user, and the IUT identifier stored on the blockchain.

7 Claims, 15 Drawing Sheets

(51) Int. Cl.
*H04L 9/32* (2006.01)
*G06F 21/33* (2013.01)
*G06F 21/32* (2013.01)
*G06Q 20/36* (2012.01)
*G06Q 20/40* (2012.01)
*H04L 9/00* (2022.01)

(52) U.S. Cl.
CPC .......... *H04L 63/102* (2013.01); *H04L 63/107* (2013.01); *H04L 9/50* (2022.05); *H04L 2209/56* (2013.01)

(56) References Cited

U.S. PATENT DOCUMENTS

| | | |
|---|---|---|
| 2002/0129251 A1 | 9/2002 | Itakura et al. |
| 2015/0254912 A1 | 9/2015 | Weisman |
| 2015/0332283 A1 | 11/2015 | Witchey |
| 2015/0363586 A1* | 12/2015 | Kievan ............... G06F 21/6245 726/19 |
| 2016/0261411 A1 | 9/2016 | Yau et al. |
| 2017/0257358 A1* | 9/2017 | Ebrahimi ............. H04L 63/083 |
| 2017/0279801 A1 | 9/2017 | Andrade |
| 2017/0372300 A1 | 12/2017 | Dunlevy et al. |
| 2018/0294966 A1* | 10/2018 | Hyun ................... H04L 9/3231 |
| 2018/0308098 A1 | 10/2018 | Ebrahimi |
| 2019/0058593 A1 | 2/2019 | Polcha et al. |
| 2019/0158487 A1 | 5/2019 | Hayes et al. |
| 2020/0076798 A1 | 3/2020 | Lidsky |

OTHER PUBLICATIONS

International Preliminary Report on Patentability dated Mar. 11, 2021 From the International Bureau of WIPO Re. Application No. PCT/IL2019/050963. (7 Pages).

International Search Report and the Written Opinion dated Nov. 25, 2019 From the International Searching Authority Re. Application No. PCT/IL2019/050963. (15 Pages).

Notice of Allowance dated Jan. 29, 2020 From the US Patent and Trademark Office Re. U.S. Appl. No. 16/114,339. (10 pages).

Official Action dated Aug. 1, 2019 From the US Patent and Trademark Office Re. U.S. Appl. No. 16/114,339. (13 pages).

Restriction Official Action dated Nov. 9, 2018 From the US Patent and Trademark Office Re. U.S. Appl. No. 16/114,339. (6 pages).

Zhu et al. "RealiD: Building a Secure Anonymous Yet Transparent Immutable ID Service", 2017 IEEE 3rd International Conference on big Data Security on Cloud (bigdatasecurity), IEEE International Conference on High Performance and Smart Computing (hpsc), and IEEE International Conference on Intelligent data and security (IDS). IEEE, p. 277-280, May 26, 2017.

* cited by examiner

FIG. 8

SYSTEMS AND METHODS FOR USER AUTHENTICATION BASED ON A GENETIC SEQUENCE

RELATED APPLICATION/S

This application is a Continuation of U.S. patent application Ser. No. 16/114,339 filed on Aug. 28, 2018. The contents of the above applications are all incorporated by reference as if fully set forth herein in their entirety.

FIELD AND BACKGROUND OF THE INVENTION

The present invention, in some embodiments thereof, relates to network security and, more specifically, but not exclusively, to systems and methods for user authentication.

Authentication is a mechanism for confirming that the quality or an aspect of a single piece of data which is claimed to be true by an entity is indeed confirmed. Authentication for example might involve confirming the identity of a person. This may be achieved by authenticating the person's identity documents. Another example is verifying the authenticity of a website by using a digital certificate. Authentication in general involves verifying the validity of at least one form of identification.

Factors of authentication are the means to ensure that the person or item are really who they claim they are. There are three factors that are the basis of an authentication process: i. something the user knows; ii. Something the user has; and iii. something the user is. Authentication process such as for the determination of a person's identity is verified by a range of elements of combinations of these factors. Once identity is verified, the user may perform authorized actions—for example, performing a transaction (Financial transaction), signing a document, share data with other parties and the like. To obtain maximal levels of security, all three factors should be verified.

Systems and methods for authentication of users are sought.

SUMMARY OF THE INVENTION

According to a first aspect, a system for creating a cryptographic non-fungible identity unique token (IUT) based on at least part of a genetic sequence of a user for network authentication of the user, comprises: a non-transitory memory having stored thereon a code, at least one hardware processor adapted to execute the code for: obtaining over a network from a client terminal, a private key linked to a public address of an electronic wallet, wherein the private key and the public address are associated with a wallet address, obtaining a digital representation of a hashed genetic sequence of a user and an associated wallet address of the electronic wallet stored on a wallet memory in communication with the network, storing in the cryptographic non-fungible IUT, an IUT identifier, the IUT identifier is an outcome of hashing a subset of the hashed digital representation and a unique password, storing the IUT in a genetic sequence record stored in a block of a blockchain dataset accessible via the network, wherein the genetic sequence record is associated with the IUT, the IUT is associated to the wallet address, wherein the user is authenticated by a match between a computed value of a password and the wallet address provided by the user, and the IUT identifier stored on the blockchain.

According to a second aspect, a system for network authentication of a user for accessing an application over a network according to a non fungible identity unique token (IUT) based on at least part of a genetic sequence of the user, comprises: a non-transitory memory having stored thereon a code, at least one hardware processor adapted to execute the code for: receiving over a network, from a client terminal, a request message for authentication of a user for accessing the application over the network, the request including one or both of a public address of an electronic wallet and a password, obtaining an IUT identifier, the IUT identifier is an outcome of hashing a digital representation of a hashed genetic sequence of a user, and a unique password, generating an indication of an authentication of the user for accessing the application when a match between a computed value of the password and the wallet address provided by the request, and the IUT identifier stored on the genetic sequence record stored on a blockchain, and providing the indication of the authentication of the user to the application.

According to a third aspect, a kit for creating an identity unique token (IUT) or transaction unique identity (TUI) for a user for network authentication of the user, comprises: a genetic data container for storing a biological sample of the user that includes at least one genetic sequence, an indication of a unique code associated to a wallet address, wherein an IUT identifier is stored in a cryptographic non-fungible IUT, the IUT identifier is an outcome of hashing a subset of a hashed digital representation and a unique password, the IUT is stored in a genetic sequence record stored in a block of a blockchain dataset accessible via the network, wherein the genetic sequence record is associated with the IUT, the IUT is associated to the wallet address, or wherein a TUI identifier is stored as metadata of a transaction record of a block of a blockchain dataset accessible via the network according to an address, the TUI identifier is an outcome of hashing the subset of the hashed digital representation and the unique password, wherein the user is authenticated by a match between a computed value of a password and the wallet address provided by the user, and the IUT identifier stored on the blockchain, or wherein the user is authenticated by a match between the TUI identifier obtained according to a user provided address of the transaction record or a user provided wallet address, and a value computed according to a user provided password and the selected subset of the digital representation of the genetic sequence stored in the blockchain.

According to a fourth aspect, a system for creating a transaction unique identity (TUI) identifier based on at least part of a genetic sequence of a user for network authentication of the user, comprises: a non-transitory memory having stored thereon a code, at least one hardware processor adapted to execute the code for: obtaining a digital representation of a hashed genetic sequence of a user, the digital representation in communication with a network, computing the TUI identifier, the TUI identifier is an outcome of hashing a subset of the hashed digital representation and a unique password, storing the TUI identifier as metadata of the transaction record of a block of a blockchain dataset accessible via the network according to the address, wherein the user is authenticated by a match between the TUI identifier obtained according to a user provided address of the transaction record or a user provided wallet address, and an authentication value computed according to a user provided password and the selected subset of the digital representation of the genetic sequence stored in the blockchain.

At least some of the systems, methods, apparatus, and/or code instructions described herein relate to the technical problem of network security, in particular, to authenticating users for grating access to applications, for example, web applications hosted by a web site, and/or mobile applications executing on a mobile device.

Traditional Methods

Traditionally, authentication was performed based on knowledge of the user, for example, a password, passphrase, PIN, challenges, and questions. The advantages of knowledge based authentication is reliance on knowledge and memory things that users carry all the time, which however, is also the main drawback. Human memory is limited and hence users tend to either forget long and safe passwords or keep them unsafe (e.g. written on a note). To overcome the drawbacks of knowledge based authentication, other factors have been attempted, optionally used in tandem. For example, ownership of a physical element, for example a card, a physical token, a device, or a cell phone. However, the physical element by itself is also prone to theft and unauthorized access.

At least some of the systems, methods, apparatus, and/or code instructions describe herein provide a technical solution to the technical problem of network security by utilizing genetic sequences (e.g., DNA) of user. The DNA of each individual on the planet is unique. DNA is an inherence factor—something the user is. DNA may be combined with the other two factors (i.e., knowledge) and physical element to increase security.

At least some of the systems, methods, apparatus, and/or code instructions described herein relate to the technical problem of resetting authentication tokens that are based on biometric data. Since biometric data of the user cannot be changed, for example, the DNA, the fingerprint, and an iris scan of a user remain constant and cannot be 'reset', when such biometric data is used to authenticate the user, the biometric data cannot be reset. The technical solution to the technical problem provided by at least some of the systems, methods, apparatus, and/or code instructions described herein is based on selecting a subset of the genetic sequence of the user to create the IUT identifier. The IUT and/or IUT identifier is reset by selecting another password and using the same subset of the same genetic sequence. Alternatively, the IUT and/or IUT identifier is reset by selecting another subset of the same genetic sequence. For example, when CODIS alleles 1-13 of 20 are selected for the original IUT, a new IUT and/or IUT identifier may be created using CODIS alleles 8-20 of 20.

At least some of the systems, methods, apparatus, and/or code instructions described herein relate to the technical problem of preventing theft of genetic sequences of users used for authentication of the user. Existing systems that use biometric data (e.g., a fingerprint, retinal pattern, a signature, face, and voice of the user, DNA) are prone to theft and improper use. Moreover, the uniqueness of such biometric data is also its disadvantage. For example, fingerprints and iris scans are encrypted and stored by mobile phone vendors or applications that use them as a proof of identity due to their uniqueness. A person stealing the mobile phone gains access to the biometrically secure data. While a hack to a password repository can be fixed by changing passwords; and physical token can be replaced; a fingerprint cannot be changed, nor the retina or an individual's DNA. Techniques for stealing biometric identifiers and using them for false authentication are widely available. At least some of the systems, methods, apparatus, and/or code instructions described herein address the technical problem by an architecture based on storage of genetic sequences of users on a publicly accessible blockchain. Blockchains storing genetic sequences are decentralized, trustless, hacker-proof, provide real ownership of the data, secure, and immutable to tampering. Once an owner is linked to the genetic sequence and stored on the blockchain, the owner and/or the genetic sequence cannot be changed. Biometric data, in principal, is a true representation of who the user is. Such sensitive asset requires a mean of storage that will ensure its security, which is found in the blockchain architecture.

At least some of the systems, methods, apparatus, and/or code instructions described herein relate to the technical problem of authenticating anonymous users for granting access to network connected applications. At least some of the systems, methods, apparatus, and/or code instructions describe herein provide a technical solution based on using genetic sequences of the individuals (e.g., DNA) that are provided via a biological sample of the user, where the identity of the user remains anonymous.

At least some of the systems, methods, apparatus, and/or code instructions described herein relate to the technical problem of "resetting" authentication security based on DNA. Although every person has their own DNA, each person has only one set of DNA. Once the DNA sequence is stolen, it cannot be replaced by the same user with another DNA sequence, in contrast to a password that can be reset. At least some of the systems, methods, apparatus, and/or code instructions described herein address the technical problem by using a subset of the DNA sequence to compute the IUT and/or IUT identifier. The IUT may be "reset" by creating a new IUT and/or IUT identifier based on a new password and/or based on the same subset or another subset of the same DNA sequence, for example, using a genetic sequence obtained from a different region of the DNA used to create the original IUT and/or IUT identifier. Moreover, since the DNA sequence is stored on the blockchain, the owner and/or sequence cannot be modified due to the properties of the blockchain. The same single sample provided by the user may be used multiple times to create new unique IUTs and/or IUT identifiers.

In a further implementation form of the first aspect, the system further comprises code for: receiving a reset request for resetting the IUT, receiving a new unique password, computing a second IUT identifier for a second cryptographic non-fungible IUT, the second IUT identifier is an outcome of hashing the new unique password and the subset of the hashed digital representation of the genetic sequence of the user, and storing the second IUT in the genetic sequence record stored in the block of the blockchain dataset, wherein the genetic sequence record is associated with the second IUT, the second IUT is associated to the wallet address, wherein the user is authenticated by a match between a compute value of a second password and the wallet address provided by the user, and the second IUT identifier stored on the blockchain.

In a further implementation form of the first aspect, the system further comprises code for: receiving again a new version of the subset of the hashed digital representation of the genetic sequence of the user, comparing the new version of the subset of the hashed digital representation of the genetic sequence of the user with the previous hashed digital representation of the genetic sequence of the user, and computing the second IUT identifier when the comparison provides a match.

In a further implementation form of the first aspect, the system further comprises code for: selecting a second subset of the digital representation of the genetic sequence from a combination of a plurality of candidate subsets of the digital representation of the genetic sequence, computing the second IUT identifier as an outcome of the hashing the new unique password and the second subset of the hashed digital representation of the genetic sequence of the user, wherein the user is authenticated by a match between the second IUT identifier stored on the blockchain and a second value computed according to a user provided second wallet address and a user provided second password.

In a further implementation form of the first aspect, an indication of the selected second subset of the digital representation of the genetic sequence is stored in the wallet according to the wallet address.

In a further implementation form of the first aspect, the system further comprises code for designating the second IUT as active and for deactivating or destroying the first IUT.

In a further implementation form of the first aspect, the system further comprises code for creating a second electronic wallet having a second wallet address, and wherein the second IUT is associated to the second wallet address.

In a further implementation form of the first aspect, the system further comprises code for verifying a match between a new geographical location of the client terminal providing the reset request and a previous geographical location of the client terminal that triggered creation of the IUT, the match is made when the new geographical location and the previous geographical location are within a same defined geographical location region.

In a further implementation form of the first, second, third, and fourth aspects, the subset of the digital representation of the genetic sequence includes a combination selected from at least one member of the group consisting of: a combination selected from a predefined number of short tandem repeats (STR) of DNA of the user selected from a plurality of candidate STR, a combination selected from a predefined number of CODIS alleles of the DNA of the user selected from candidate CODIS alleles, a combination selected from a predefined number of sequences of the human leukocyte antigen (HLA) system selected from candidate HLA sequences, and a combination selected from a predefined number of gene complexes encoding the major histocompatibility complex (MHC) proteins selected from candidate MHC protein gene complexes.

In a further implementation form of the first, second, third, and fourth aspects, the computed value is computed by hashing a subset of the digital representation of the genetic sequence obtained according to the user provided wallet address and the user password provided by the user.

In a further implementation form of the first aspect, the system further comprises code for storing the IUT in the wallet according to the wallet address, wherein the genetic sequence record is stored in a block of a blockchain dataset accessible via the network mapped to the IUT stored in the wallet, the IUT is associated to the address of the genetic sequence record.

In a further implementation form of the first, second, third, and fourth aspects, the match for authentication of the user is executed by smart contract code stored in association with a blockchain dataset, and triggered by at least one of: a network connected authentication server, an application, and a client terminal used by the user.

In a further implementation form of the first, second, third, and fourth aspects, the genetic sequence is obtained from a biological sample provided by the sample individual.

In a further implementation form of the first, second, and third aspects, the IUT is based on at least one of the following Ethereum® protocols: ERC 721, ERC 994, ERC223, or a NEO protocol including NEP-5.

In a further implementation form of the first, second, and third aspects, a value of IUT is zero in all cyptocurrencies.

In a further implementation form of the first, second, third, and fourth aspects, respective copies of the blockchain storing genetic sequence records of genetic sequences of users are stored on a plurality of network nodes, wherein the code is implemented as smart contract code executed by an authentication server, wherein the code is for obtaining the selected subset of the digital representation of the genetic sequence from one of the copies of the blockchain stored by one of the network nodes according to an indication serving as an index of the digital representation of the genetic sequence.

In a further implementation form of the first, second, third, and fourth aspects, further comprising an application dataset storing a respective authentication indication for each of a plurality of authenticated applications that are authenticated to obtain an authentication indication indicative of the authenticated user.

In a further implementation form of the second aspect, the request for authentication is received over the network via a callback mechanism issued by the application executing on an application server.

In a further implementation form of the second aspect, the request for authentication further comprises at least one application credential for authentication of the application.

In a further implementation form of the second aspect, the indication of the authentication of the user is provided over the network to the application in response to the request via the callback mechanism.

In a further implementation form of the second aspect, the system further comprises code instructions for: receiving from the application over the network in response to the indication of the authentication of the user, a request for an access token for accessing a protected resource, and providing the access token to the application in response to the request for the access token.

In a further implementation form of the second aspect, the system further comprises code instructions for: receiving the access token from the application over the network, and providing the protected resource over the network to the application in response to the access token.

In a further implementation form of the third aspect, the kit further comprises an indication of a unique password for accessing an electronic wallet associated with the wallet address.

In a further implementation form of the third aspect, the wallet address is encoded into a physical scannable code for scanning by an imaging sensor of a client terminal.

In a further implementation form of the third aspect, an electronic wallet associated with the wallet address is automatically created when the physical scannable code is scanned by the imaging sensor.

In a further implementation form of the third aspect, the indication of the wallet address is hidden by a non-reversible hidden mechanism that is removed by the user.

In a further implementation form of the third aspect, an address of a preexisting wallet is provided in response to scanning of the physical scannable code.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 8 is an example of a GUI presenting a list of transactions for created and/or stored and/or defined IUTs, in accordance with some embodiments of the present invention;

DESCRIPTION OF SPECIFIC EMBODIMENTS OF THE INVENTION

Figure 1:
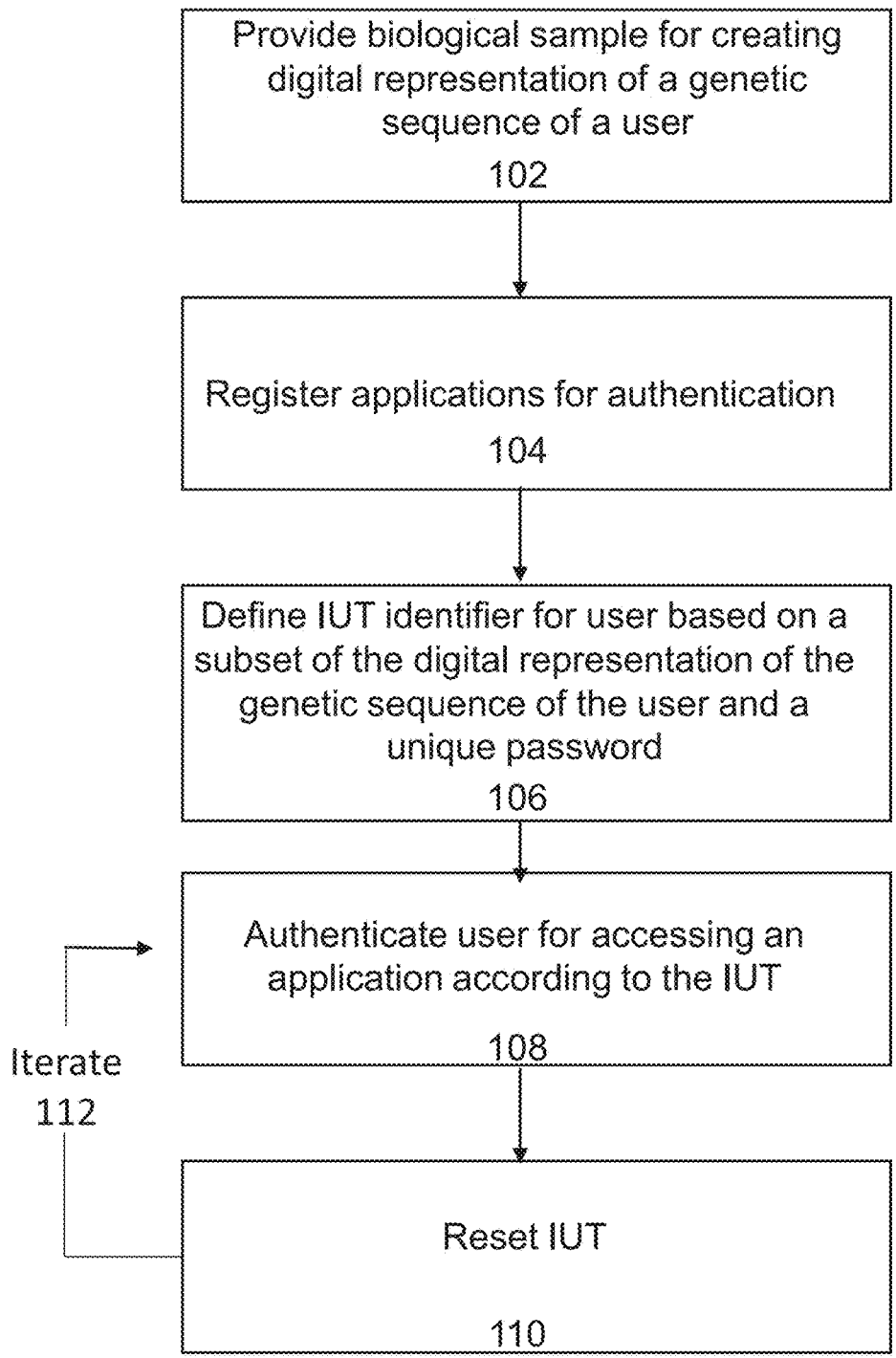
FIG. 1 is a flowchart of a high level method for authentication of a user based on a IUT and/or TUI computed according to at least part of a subset of a digital representation of a genetic sequence of the user stored in a blockchain dataset, in accordance with some embodiments of the present invention.

The present invention, in some embodiments thereof, relates to network security and, more specifically, but not exclusively, to systems and methods for user authentication.

An aspect of some embodiments of the present invention relates to systems, an apparatus, methods, and/or code instructions (e.g., stored on a data storage device, executable by one or more hardware processors) for creating and/or defining a cryptographic non fungible identity unique token (IUT) based on at least part of a genetic sequence of a user, for authentication of the user (optionally network authentication of the user), for example, for granting the user access to an application. An IUT identifier is an outcome (e.g., result of a computation) of an encryption (optionally hashing) of an encrypted (optionally hashed) subset of the digital representation of the genetic sequence of the user and a unique password of the user. The unique password may be a user selected password and/or may be a private key linked to a public key of an electronic wallet stored on a wallet memory and/or a generated password. The private key and the public address of the wallet are associated with a wallet address. The wallet address may be associated with a unique name (optionally selected by the user, for example "John Doe 123"), where the unique name serves as a proxy for the wallet address, since the wallet address may be a long sequence of characters that is hard for the user to remember. The subset may be a combination of candidate portions of the genetic sequence of the user, for example, a combination of defined alleles. The IUT identifier is stored in the IUT. The IUT identifier and/or IUT (which includes the IUT identifier) may be stored in a genetic sequence record (also referred to as Token Index) stored in a block of a blockchain dataset accessible via the network. The genetic sequence record is mapped to the IUT (and/or the IUT identifier), and optionally the IUT (and/or IUT identifier) is associated to the wallet address of the electronic wallet. Alternatively or additionally, the IUT (and/or IUT identifier) is stored in the electronic wallet of the user according to the wallet address. The user is authenticated (when a match is identified between the IUT identifier stored on the blockchain, and a computed value (e.g., encrypted value, such as a hash) of a user provided password and the wallet address provided by the user. The match may be computed by smart contract code associated with a blockchain dataset in communication with the network. The match may be triggered, for example, by an authentication server such as for authentication of a user for accessing an application and/or sensitive data, by an application which may be stored on an application server for access by the user, and/or by the user via a client terminal such as within a session. The user provided wallet address (which may be provided via a user provided unique name that corresponds to the wallet address) may denote the address of the defined cryptographic non-fungible IUT stored on the blockchain, where the IUT stores the IUT identifier. For example, the wallet address is associated with the address of the IUT on the blockchain. Alternatively or additionally, the user provided wallet address is used to access the encrypted subset of the digital representation of the genetic sequence of the user, which may be stored in the wallet associated with the wallet address, and/or stored on the blockchain in association with the wallet address (e.g., the record storing the subset has a field indicating the wallet address and/or the wallet associated with the wallet address has a field indicating the address of the subset). The authentication is performed when the value computed according to the subset and the user provided password (e.g., hashing of the subset and the password) matches the IUT identifier stored on the blockchain.

An aspect of some embodiments of the present invention relates to systems, an apparatus, methods, and/or code instructions (e.g., stored on a data storage device, executable by one or more hardware processors) for network authentication of a user for accessing an application over a network according to a non fungible identity unique token (IUT) based on at least part of a genetic sequence of the user. A request message for authentication of a user for accessing the application over the network is received. The request includes a public address of an electronic wallet and/or unique name of the wallet and/or wallet address of the wallet and/or an IUT identifier, and a subset of a digital representation of a genetic sequence of the user stored in a block of a blockchain dataset accessible via the network. The genetic sequence record stored in the IUT stored in the blockchain dataset is obtained. The genetic sequence record is mapped to the IUT. The IUT is associated to the wallet address. An IUT identifier of the IUT is an outcome of hashing a subset of a hashed digital representation of a target genetic sequence of a target user and a target unique password. The selected subset of the digital representation of the genetic sequence stored in the blockchain is obtained. An authentication value is computed according to the user provided wallet address (or unique name denoting the wallet address) used to obtain the selected subset of the digital representation of the genetic sequence stored in the blockchain, and a user provided password. The authentication value may be computed by hashing (or other encryption process) the subset of the digital representation of the genetic sequence obtained according to the wallet address, and the user provided password. An indication of an authentication of the user for accessing the application is generated when the authentication value matches the IUT identifier. The indication of the authentication of the user is provided to the application.

Optionally, the IUT is reset by computing another IUT, optionally another IUT identifier for another cryptographic non-fungible IUT. The second IUT identifier is an outcome (e.g., computed according to) hashing a new unique password and the subset of the hashed digital representation of the genetic sequence of the user obtained from the blockchain. The subset of the hashed digital representation of the genetic sequence may be the same subset used for the previous IUT. Alternatively the subset of the hashed digital representation of the genetic sequence may be a different combination of the candidate portions of the genetic sequence, such as a different combination of the defined alleles. In the second case, the second subset of the digital representation of the genetic sequence is obtained from a portion of DNA of the user that is different than the selected subset of the digital representation of the genetic sequence. The second IUT may be stored in the genetic sequence record stored in the block of the blockchain dataset. The genetic sequence record is mapped to the second IUT, and optionally the second IUT is associated to the wallet address. Alternatively or additionally, the second selected subset of the digital representation of the genetic sequence of the user may be stored in the electronic wallet of the user. The user is authenticated by a match between the second IUT identifier stored on the blockchain and a second authentication value computed according to a user provided second password and a second wallet address provided by the user. The second wallet address is used to obtain the second IUT identifier and/or used to obtain the subset of the digital representation of the genetic sequence stored in the blockchain.

An aspect of some embodiments of the present invention relates to a kit for creating an IUT for a user for network authentication of the user. The kit includes a genetic data container for storing a biological sample of the user that includes a genetic sequence, for example, a test tube for storing a sample of saliva provided by the user. The kit includes an indication of wallet address of an electronic wallet stored on a wallet memory in communication with a network, for example, as a code scannable by a camera of a mobile device. A digital representation of the genetic sequence extracted from the biological sample of the user is stored by a genetic sequence record in a block of a blockchain dataset. The genetic sequence record is mapped to the IUT. The IUT may be associated to a wallet address of the electronic wallet. An IUT identifier is generated and stored in a cryptographic non-fungible IUT as described herein. The IUT identifier is an outcome of hashing a subset of the hashed digital representation and a unique password. The IUT is stored in the genetic sequence record stored in the block of the blockchain dataset accessible via the network.

An aspect of some embodiments of the present invention relates to systems, an apparatus, methods, and/or code instructions (e.g., stored on a data storage device, executable by one or more hardware processors) for creating and/or defining a transaction unique identity (TUI) identifier based on at least part of a genetic sequence of a user, for authentication of the user (optionally network authentication of the user), for example, for granting the user access to an application. The TUI identifier is an outcome (e.g., result of a computation) of an encryption (optionally hashing) of an encrypted (optionally hashed) subset of the digital representation of the genetic sequence of the user and a unique password of the user. The unique password may be a user selected password. The subset may be a combination of candidate portions of the genetic sequence of the user, for example, a combination of defined alleles. The TUI identifier is stored in metadata of a transaction record of a block of a blockchain dataset. The transaction record may be based on the implementation of the blockchain dataset and/or for recording transactions of defined cryptocurrencies, for example, Bitcoin, Etherium blockchain, EOS, and the like. The genetic sequence record is mapped to the transaction record storing the TUI identifier, and the TUI identifier is associated to the unique ID (i.e., address) of the transaction record stored in the blockchain dataset. The user is authenticated (e.g., by smart contract code which may be triggered for example, by an authentication server in communication with the network, by an application, and/or by the user such as via a client terminal used by the user) when a match is identified between the TUI identifier (which is identified based on an address of the transaction record provided by the user, referred to herein as unique ID) and a computed value (e.g., hashing) of the wallet address provided by the user used to obtain the selected subset of the digital representation of the genetic sequence stored in the blockchain and/or used to obtain the IUT identifier stored on the blockchain, and a user provided password.

An aspect of some embodiments of the present invention relates to systems, an apparatus, methods, and/or code instructions (e.g., stored on a data storage device, executable by one or more hardware processors) for network authentication of a user for accessing an application over a network according to a transaction unique identity (TUI) identifier based on at least part of a genetic sequence of the user. A request message for authentication of a user for accessing the application over the network is received. The request includes an address of the transaction record storing the TUI identifier, and a subset of a digital representation of a genetic sequence of the user stored in a block of a blockchain dataset accessible via the network. The genetic sequence record mapped to the TUI identifier is obtained. The TUI is stored as metadata of a transaction record of a block of a blockchain. The TUI identifier is associated to the address of the transaction record. The TUI identifier is an outcome of hashing a subset of a hashed digital representation of a target genetic sequence of a target user and a target unique password. The selected subset of the digital representation of the genetic sequence stored in the blockchain is obtained. An authentication value is computed according to the selected subset of the digital representation of the genetic sequence stored in the blockchain and a user provided password. An indication of an authentication of the user for accessing the application is generated when the authentication value matches the TUI identifier obtained according to a user provided address of the transaction record storing the TUI identifier. The indication of the authentication of the user is provided to the application.

An aspect of some embodiments of the present invention relates to a kit for creating a TUI identifier for a user for network authentication of the user. The kit includes a genetic data container for storing a biological sample of the user that includes a genetic sequence, for example, a test tube for storing a sample of saliva provided by the user. The kit includes an indication of an address of a transaction record stored in a blockchain dataset in communication with a network, for example, as a code scannable by a camera of a mobile device. A digital representation of the genetic sequence extracted from the biological sample of the user is stored by a genetic sequence record in a block of a blockchain dataset accessible over the network. The genetic sequence record is mapped to the transaction record storing the TUI identifier. The TUI identifier is stored as metadata of the transaction record of a block of a blockchain. The TUI identifier is an outcome of hashing a subset of the hashed digital representation and a unique password.

As used herein, the term genetic sequence record may sometimes be substituted with the term Token Index.

At least some of the systems, methods, apparatus, and/or code instructions described herein relate to the technical problem of network security, in particular, to authenticating users for grating access to applications, for example, web applications hosted by a web site, and/or mobile applications executing on a mobile device.

Traditional Methods

Traditionally, authentication was performed based on knowledge of the user, for example, a password, passphrase, PIN, challenges, and questions. The advantages of knowledge based authentication is reliance on knowledge and memory—things that users carry all the time, which however, is also the main drawback. Human memory is limited and hence users tend to either forget long and safe passwords or keep them unsafe (e.g. written on a note). To overcome the drawbacks of knowledge based authentication, other factors have been attempted, optionally used in tandem. For example, ownership of a physical element, for example a card, a physical token, a device, or a cell phone. However, the physical element by itself is also prone to theft and unauthorized access.

At least some of the systems, methods, apparatus, and/or code instructions describe herein provide a technical solution to the technical problem of network security by utilizing genetic sequences (e.g., DNA) of user. The DNA of each individual on the planet is unique. DNA is an inherence factor—something the user is. DNA may be combined with the other two factors (i.e., knowledge) and physical element to increase security.

At least some of the systems, methods, apparatus, and/or code instructions described herein relate to the technical problem of resetting authentication tokens that are based on biometric data. Since biometric data of the user cannot be changed, for example, the DNA, the fingerprint, and an iris scan of a user remain constant and cannot be 'reset', when such biometric data is used to authenticate the user, the biometric data cannot be reset. The technical solution to the technical problem provided by at least some of the systems, methods, apparatus, and/or code instructions described herein is based on selecting a subset of the genetic sequence of the user to create the IUT identifier. The IUT and/or IUT identifier is reset by selecting another password and using the same subset of the same genetic sequence. Alternatively, the IUT and/or IUT identifier is reset by selecting another subset of the same genetic sequence. For example, when CODIS alleles 1-13 of 20 are selected for the original IUT, a new IUT and/or IUT identifier may be created using CODIS alleles 8-20 of 20.

At least some of the systems, methods, apparatus, and/or code instructions described herein relate to the technical problem of preventing theft of genetic sequences of users used for authentication of the user. Existing systems that use biometric data (e.g., a fingerprint, retinal pattern, a signature, face, and voice of the user, DNA) are prone to theft and improper use. Moreover, the uniqueness of such biometric data is also its disadvantage. For example, fingerprints and iris scans are encrypted and stored by mobile phone vendors or applications that use them as a proof of identity due to their uniqueness. A person stealing the mobile phone gains access to the biometrically secure data. While a hack to a password repository can be fixed by changing passwords; and physical token can be replaced; a fingerprint cannot be changed, nor the retina or an individual's DNA. Techniques for stealing biometric identifiers and using them for false authentication are widely available. At least some of the systems, methods, apparatus, and/or code instructions described herein address the technical problem by an architecture based on storage of genetic sequences of users on a publicly accessible blockchain. Blockchains storing genetic sequences are decentralized, trustless, hacker-proof, provide real ownership of the data, secure, and immutable to tampering. Once an owner is linked to the genetic sequence and stored on the blockchain, the owner and/or the genetic sequence cannot be changed. Biometric data, in principal, is a true representation of who the user is. Such sensitive asset requires a mean of storage that will ensure its security, which is found in the blockchain architecture.

At least some of the systems, methods, apparatus, and/or code instructions described herein relate to the technical problem of authenticating anonymous users for granting access to network connected applications. At least some of the systems, methods, apparatus, and/or code instructions describe herein provide a technical solution based on using genetic sequences of the individuals (e.g., DNA) that are provided via a biological sample of the user, where the identity of the user remains anonymous.

At least some of the systems, methods, apparatus, and/or code instructions described herein relate to the technical problem of "resetting" authentication security based on DNA. Although every person has their own DNA, each person has only one set of DNA. Once the DNA sequence is stolen, it cannot be replaced by the same user with another DNA sequence, in contrast to a password that can be reset. At least some of the systems, methods, apparatus, and/or code instructions described herein address the technical problem by using a subset of the DNA sequence to compute the IUT and/or IUT identifier. The IUT may be "reset" by creating a new IUT and/or IUT identifier based on a new password and/or based on the same subset or another subset of the same DNA sequence, for example, using a genetic sequence obtained from a different region of the DNA used to create the original IUT and/or IUT identifier. Moreover, since the DNA sequence is stored on the blockchain, the owner and/or sequence cannot be modified due to the properties of the blockchain. The same single sample provided by the user may be used multiple times to create new unique IUTs and/or IUT identifiers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional details regarding DNA are now described. DNA (short for Deoxyribonucleic acid) is the molecule that carries the genetic instructions for growth, development, functioning and reproduction of almost all known living organisms. Most DNA molecules consist of two biopolymer strands coiled around each other to form a double helix. The double helix is composed of long chains of four nucleotides: (cytosine [C], guanine [G], adenine [A] or thymine [T]). DNA is arranged in structures called chromosomes and humans carry 23 pairs of chromosomes. DNA is composed of coding and noncoding regions with the coding sequences storing biological information in genes that code for proteins—the building blocks of living organisms. Human DNA consists of about 3 billion bases, of which approximately 99 percent are the same in all people. The order, or sequence, of these bases determines the information available for building and maintaining an organism, similar to the way in which letters of the alphabet appear in a certain order to form words and sentences.

Tandem repeats in DNA are a repeated pattern of one or more nucleotides that are directly adjacent to each other. In humans, Tandem DNA repeat regions are found and exhibit a high degree of variability between different human beings. Various types of DNA repeat regions have been classified mainly based on the length of their core repeat regions. When the repeat is of between 10-50 nucleotides it is called minisatellite, when the repeat is composed of a fewer than 10 nucleotides it is usually referred to as microsatellite or short tandem repeats. Repeats could be of two nucleotides— "dinucleotide repeat or of three nucleotides—trinucletodies. When the number of the core repeat units varies between individuals in the population, it is called a variable number tandem repeat (VNTR). Short tandem repeats (STRs), also called simple sequence repeats (SSRs), have a core unit of between 2-6 nucleotides in length. In many cases the number of the STRs for individuals in a population differs. STRs may be used for human forensics and identity testing, and for scientific and genealogical purposes such as genetic mapping, and linkage analysis.

Short Tandem Repeat (STR) analysis, referred to as STR typing is a method that compares specific loci on DNA from two or more samples and measuring the exact number of repeating units in those samples. In STR typing, probes attach to specific regions on the DNA and a polymerase chain reaction (PCR) is employed to discover the lengths of the short tandem repeat resulting in discrimination between different alleles. Because a typical STR typing analysis will use multiple STR loci that are not genetically linked, the product rule can be applied to estimate the probability of a random match to any STR profile where population allele frequencies have been characterized for each loci leading to extremely high differentiation power with low random match probabilities within the human population. Additional details are described with reference to U.S. Pat. No. 8,871, 471, incorporated herein by reference in its entirety.

Historically the FBI the has established 13 nationally recognized core STR loci that are included in a national forensic DNA database known as the Combined DNA Index System (CODIS). The 13 CODIS core loci include: CSF1PO, FGA, TH01, TPDX, VWA, D3S1358, D5S818, D7S820, D8S1179, D13S317, D16S539, D18S51, and D21S11 and are used to identify a person.

In early 2015, the FBI announced that the validation project for additional CODIS Core Loci had been completed and that an additional seven loci would be added to the CODIS Core effective Jan. 1, 2017.3 The additional seven loci—D1S1656, D2S441, D2S1338, D10S1248, D12S391, D19S433 and D22S1045—along with the original 13 loci, will comprise the new CODIS Core Loci. List of 20 CODIS Core Loci: CSF1PO, D3S1358, D5S818, D7S820, D8S1179, D13S317, D16S539, D18S51, D21S11, FGA, TH01, TPOX, vWA, D1S1656, D2S441, D2S1338, D10S1248, D12S391, D19S433, D22S1045.

STR-typing using STR markers has become the human forensic "gold standard" as the combined information derived from the 13 distinct CODIS alleles provide enough information to uniquely identify an individual's DNA signature to a statistical significance of 1 in 109. Additional details are described with reference to U.S. Pat. No. 8,871, 471, incorporated herein by reference in its entirety.

As used herein, the term IUT may sometimes refer to IUT identifier. The terms IUT and IUT identifier may sometimes be interchanged. For example, the IUTs may be obtained from a storage pool of previously created IUTs. The IUT identifier of the obtained IUT may be defined as described herein. As such, the IUT identifiers of the obtained IUTs are defined, rather than creating a new IUT. In other implementations, a new IUT having a new IUT identifier is created.

As used herein, the term digital representation of the genetic sequence may sometimes refer to an encrypted version of the digital representation of the genetic sequence, for example, a hashed version of the digital representation of the genetic sequence. The encrypted version may be stored in the blockchain rather than the raw the digital representation of the genetic sequence to provide an added layer of security.

The IUT described herein may sometimes be replaced by the TUI identifier described herein. In such cases, the value of the IUT identifier described herein (which is an outcome of hashing a subset of the hashed digital representation and a unique password) is referred to as the TUI identifier. The TUI identifier is stored in a transaction record of a blockchain dataset, for example, as metadata of the transaction record stored in a block of the blockchain dataset. Each transaction record in the blockchain as a unique ID, which may correspond to the public address, wallet address, and/or unique name of the wallet, in implementations using the TUI identifier. The TUI identifier stored in the transaction record of the blockchain may be obtained by the unique ID. Authentication is performed based on the TUI identifier obtained according to the unique ID (which may be provided by a user). The obtained TUI identifier is matched to an outcome of hashing of the hashed genetic sequence of the user and a user provided password.

Figure 2A:
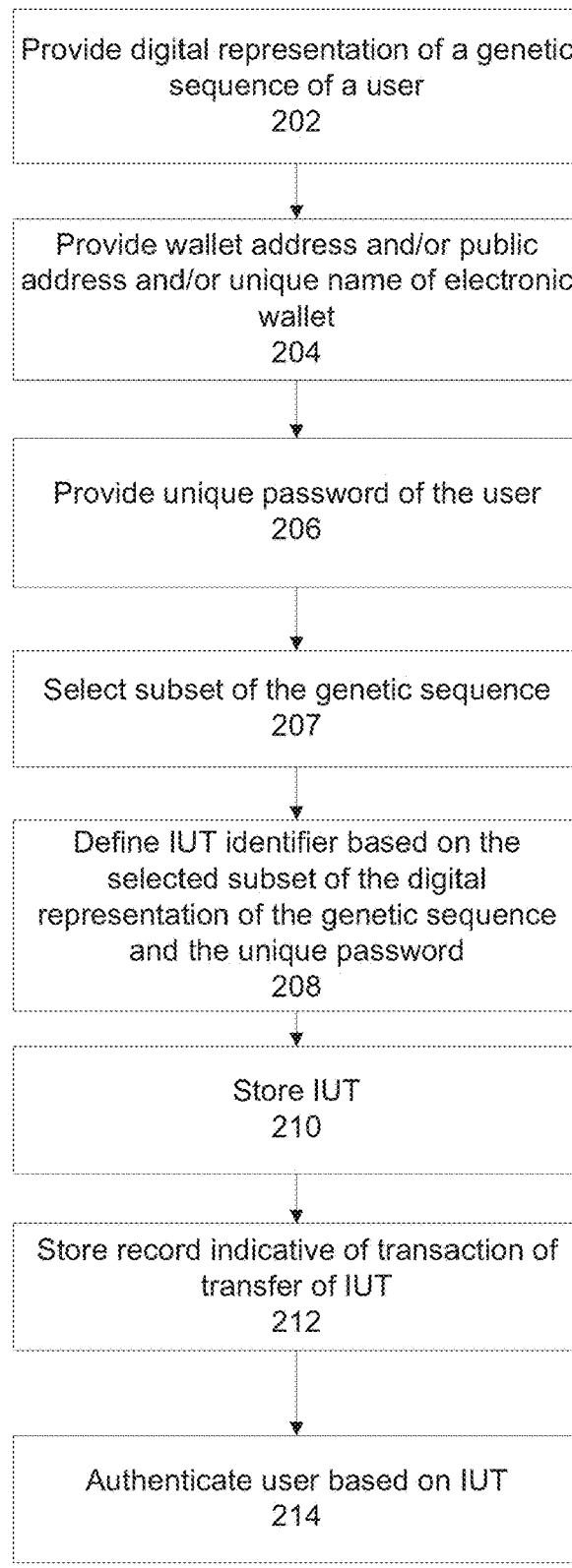
FIG. 2A is a flowchart of an exemplary process for creating and/or storing an IUT based on a genetic sequence of a user stored in a publicly accessible blockchain dataset, for authentication of the user, in accordance with some embodiments of the invention.
Figure 2B:
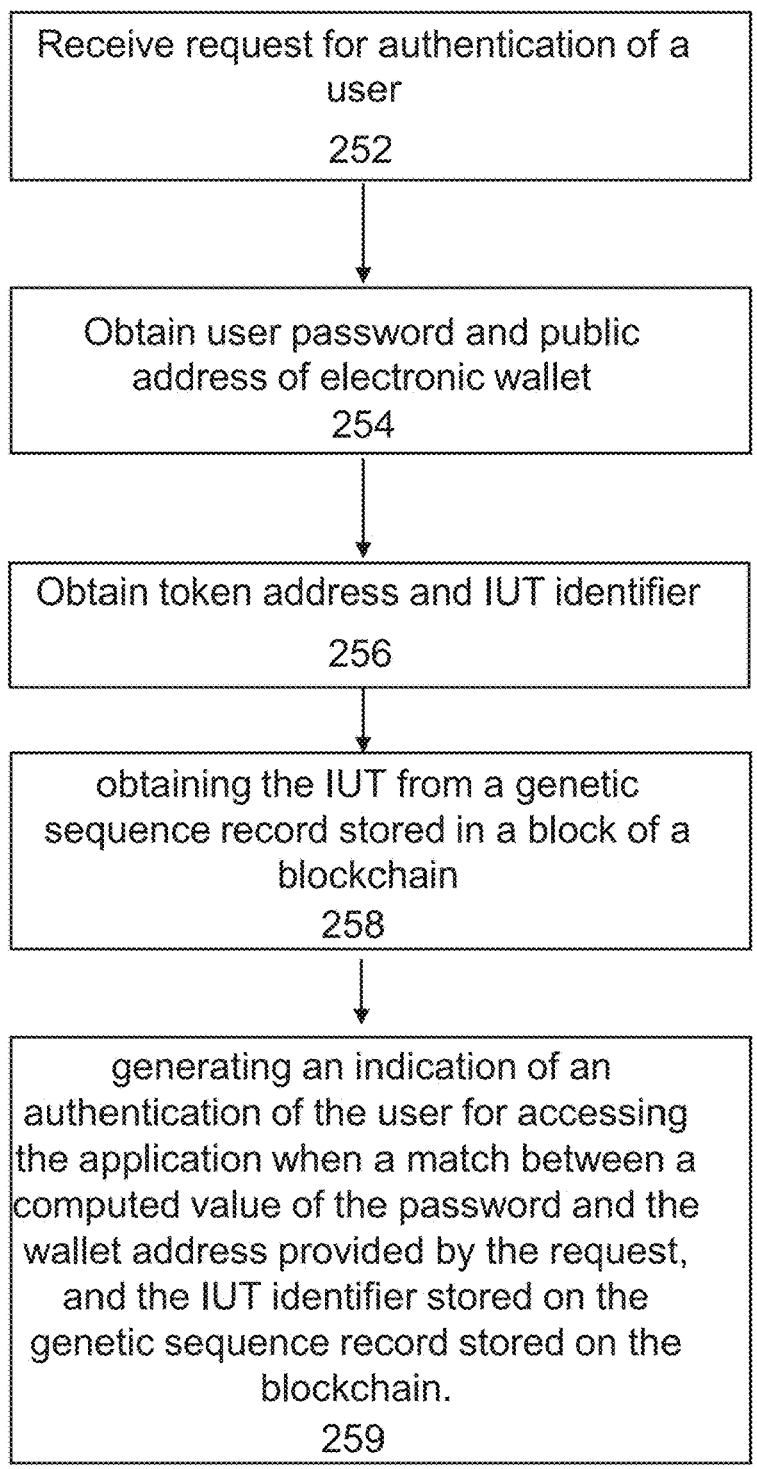
FIG. 2B is a flowchart of an exemplary process for authentication of a user for accessing an application according to a IUT based on at least part of a genetic sequence of the user stored in a blockchain dataset, in accordance with some embodiments of the present invention.
Figure 2C:
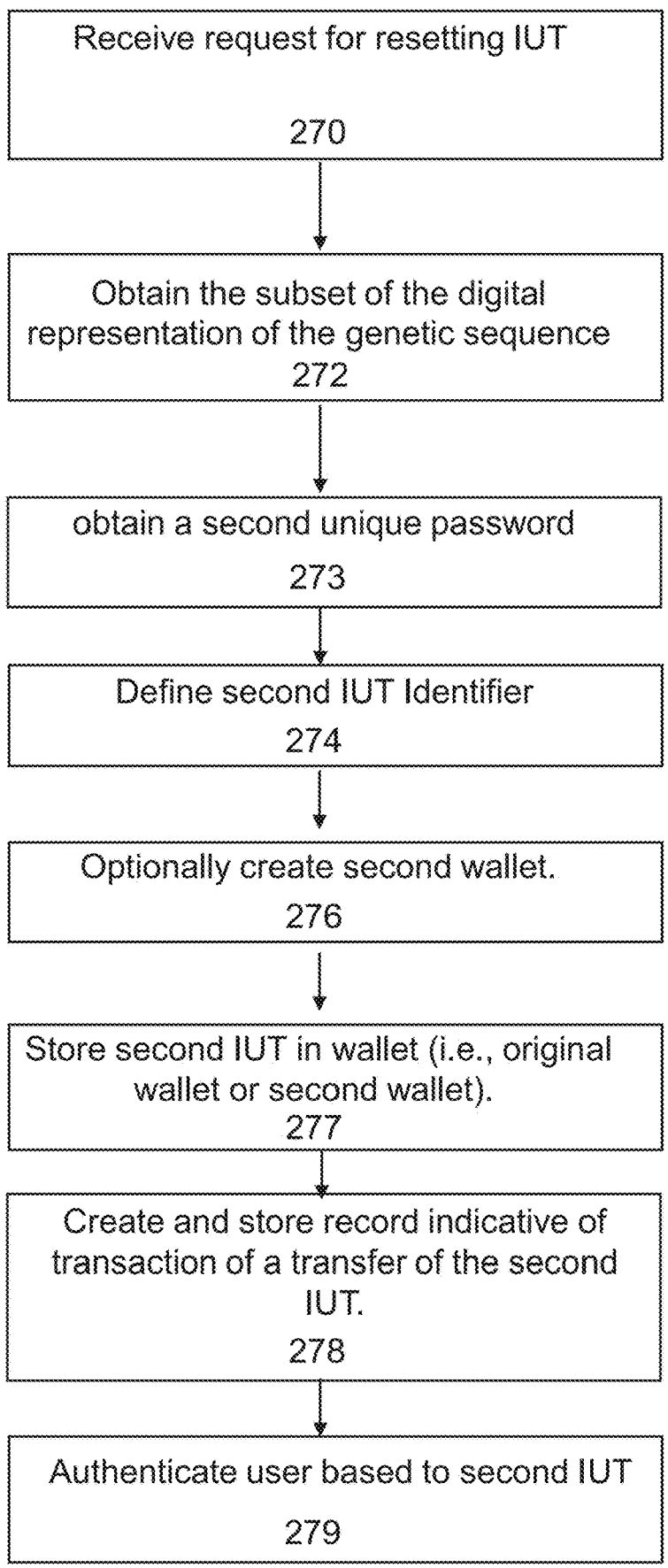
FIG. 2C is a flowchart of an exemplary process for resetting the IUT, in accordance with some embodiments of the present invention.
Figure 2D:
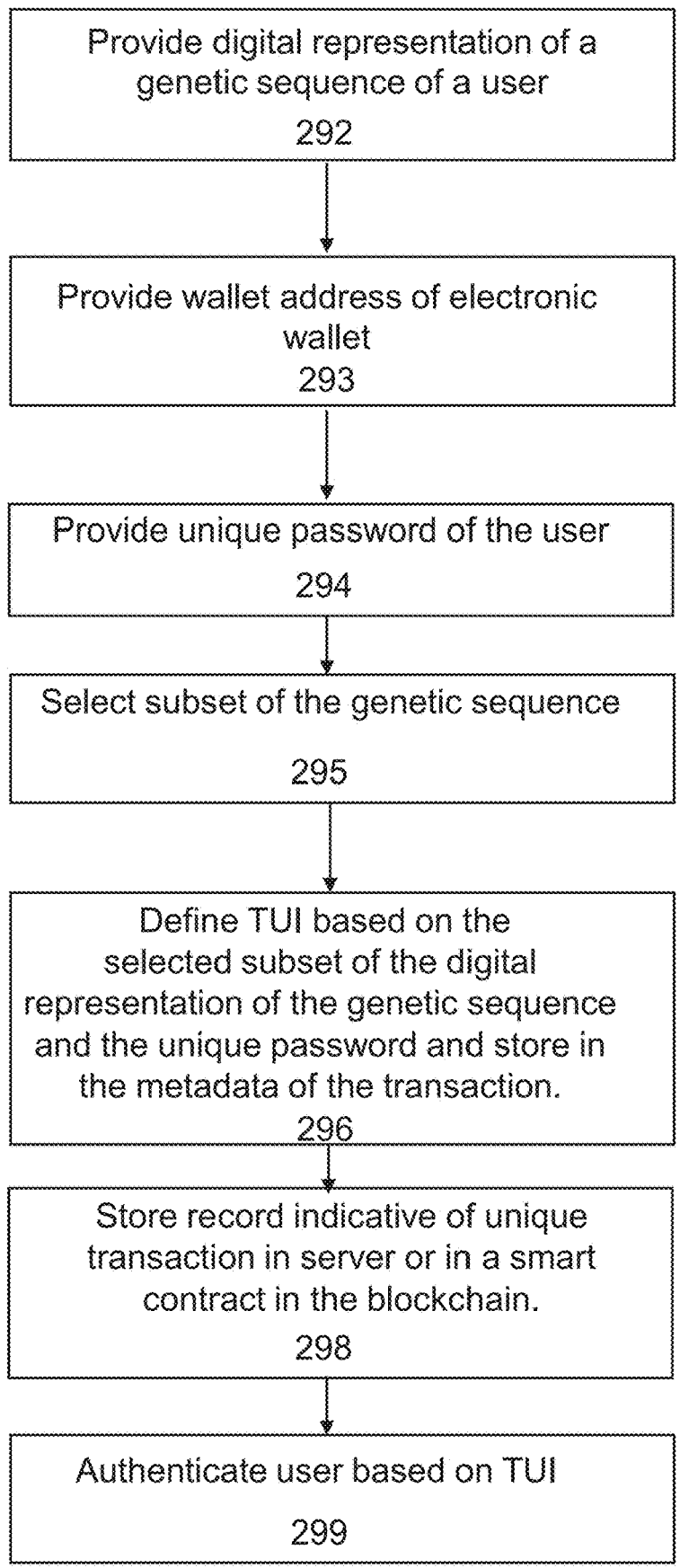
FIG. 2D is a flowchart of an exemplary process for creating and/or storing and/or defining a TUI identifier for authentication of the user, in accordance with some embodiments of the invention.
Figure 3:
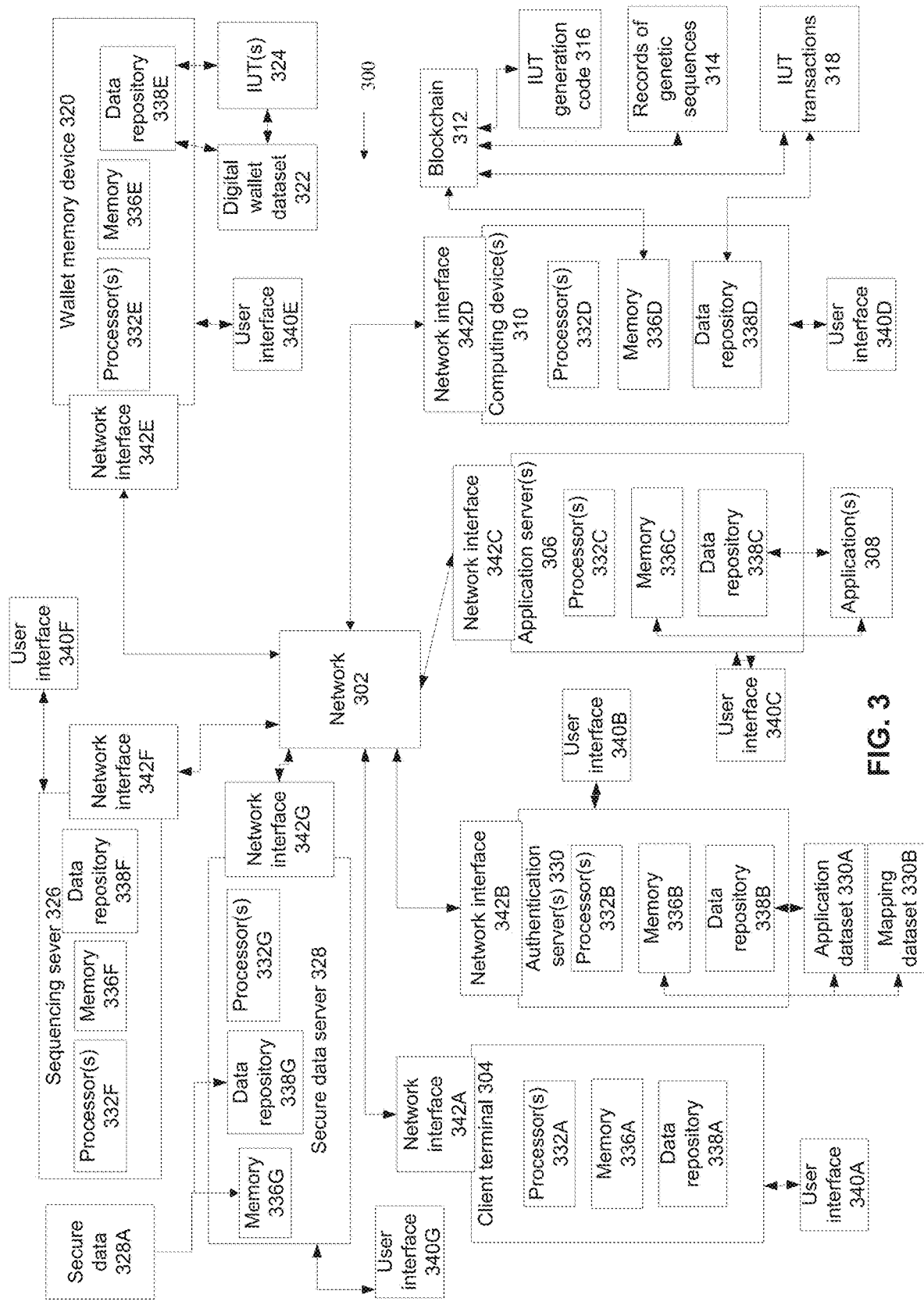
FIG. 3 is a schematic of components of a system for generating and/or storing and/or defining an IUT based on a genetic sequence of a user, and/or for authentication of the user according to the IUT, in accordance with some embodiments of the present invention.

Reference is now made to FIG. 1, which is a flowchart of a high level method for authentication of a user based on a IUT and/or TUI computed according to at least part of a subset of the digital representation of a genetic sequence of the user stored in a blockchain dataset, in accordance with some embodiments of the present invention. Reference is also made to FIG. 2A, which is a flowchart of an exemplary process for creating and/or storing an IUT based on a genetic sequence of a user stored in a publicly accessible blockchain dataset, for authentication of the user (optionally network authentication), in accordance with some embodiments of the invention. Reference is now also made to FIG. 2B, which is a flowchart of an exemplary process for authentication of a user (optionally network authentication) for accessing an application (e.g., stored on an application server) according to a IUT based on at least part of a genetic sequence of the user stored in a blockchain dataset, in accordance with some embodiments of the present invention. Reference is now also made to FIG. 2C, which is a flowchart of an exemplary process for resetting the IUT, in accordance with some embodiments of the present invention. It is noted that FIGS. 2A-2C may be adapted to use the TUI instead of and/or in addition to the IUT, as described herein. Reference is also made to FIG. 2D, which is a flowchart of an exemplary process for creating and/or storing and/or defining a TUI identifier for authentication of the user, in accordance with some embodiments of the invention. Reference is now also made to FIG. 3, which is a schematic of components of a system 300 for generating and/or storing and/or defining an IUT based on a genetic sequence of a user, and/or for authentication of the user according to the IUT, in accordance with some embodiments of the present invention. Components of system 300 may implement the acts of the methods described with reference to FIGS. 1 and/or 2A-2D, by code instructions stored in a memory executed by one or more hardware processors of one or more devices.

It is noted that system 300 depicted in FIG. 3 is an exemplary implementation, and other architectures are possible. For example, device 304, 330, 306, 310, 320, 32, and/or 328 may be implemented as code instructions stored on a memory for execution by hardware processor(s), and not necessarily limited by the described architecture.

One or more of the following devices are in communication with one another over a network 302:

Client terminal(s) 302 may be used by the user being authenticated and/or setting up the IUT.

Authentication server(s) 330 may perform the authentication of the user. Authentication server(s) 330 may include and/or be implemented as smart contract code. Application server(s) 330 may store an application dataset 330A of application authorized to perform authentication of users based on IUT. Application server(s) 330 may store a mapping dataset 330B that maps between IUT identifiers (computed according to a user provided wallet address (or unique name denoting the wallet address) (e.g., unique password and/or private key of an electronic wallet and/or address of the IUT defined by the user) and wallet address (e.g., public addresses thereof, unique name of the wallet, optionally linked to the private key acting as the IUT identifier). Mapping dataset 330 may map between wallet addresses and unique names assigned as proxies to the wallet addresses. Since the wallet address may be a long sequence of characters that is hard for the user to remember, the user may assign an easy to remember set of characters to substitute for the wallet address, for example "John Doe 123".

Mapping dataset 330B may be stored on computing device 310 and/or another network connected computing device (not shown).

Application server(s) 306 which may store application(s) 308 that require authentication by the user for access thereof, for example, a banking application, a government database, an online tool, a military server, and a social network account.

Computing device(s) 310 that each store respective copies of a blockchain 312 that stores transactions records that may store TUI identifiers, records of digital representations of genetic sequences of users 314 (e.g., records are stored in blocks and/or as blocks), and/or that stores IUT code 316 which may be stored as smart contract code executed on the blockchain 312, and/or IUT transaction records 318 indicative of transfer of IUTs for example to destination wallet addresses and/or to mapping dataset 330B. IUT transaction records 318 may be stored in blockchain 312, and/or in another blockchain dedicated to storing IUT transaction records. Computing devices 310 that execute IUT generation code 316 may be referred to herein as IUT nodes. Computing devices 310 that store blockchain 312 and/or execute smart contract code may be referred to herein as blockchain nodes.

Wallet memory device 320, sometimes referred to herein as wallet memory, may store one or more digital wallets 322 of the users being authenticated. Each digital wallet 322 stores a respective IUT identifier and/or IUT (including the IUT identifier) 324 generated according to a subset of the genetic sequence of the user, as described herein. The term IUT 324 includes at least the IUT identifier. Optionally, each digital wallet 322 stores an indication of a combination of candidate portions of the digital representation of the genetic sequence used to define the respective IUT identifier, for example, a combination of 13 CODIS from 20 candidate CODIS. When the IUT is reset (as described herein), the respective digital wallet stores the newly created IUT identifier and/or IUT (which includes the IUT identifier) and may store the new combination of genetic sequences used to define the new IUT identifier, for example, another combination of 13 CODIS selected from the 20 candidate CODIS. Wallet memory device (s) may be stored on a centralized and/or decentralized network architecture.

Sequencing server 326 may provide the digital representation of the genetic sequence of the user for storage in blockchain 312. A biological sample obtained from the user, optionally, via a kit as described herein, is sequenced by a sequencing machine to generate the digital representation of the genetic sequence. In another example, sequencing serer 326 stores a previously obtained genetic sequence, for example, provided by an electronic medical record (EMR) of the patient, for example, obtained during genetic testing. The digital representation of the genetic sequence of the user may be encrypted, optionally hashed for storage in blockchain 312, for example, by sequencing server 326, authentication server 330, and/or computing device(s) 310, and/or other devices.

Secure data server 328 may store secure data 328A being accessed by the user via application 308. Alternatively, secure data 328A is stored by application server 306.

Components of system 300 may be arranged into different architectures, by integrating two or more devices and/or one devices performs features of one or more other devices, for example one or a combination of the following:

- Application 308 is locally stored by client terminal 304. Application 308 may be downloaded from application server 306 by client terminal 304.
- Application server 306 performs the function of authentication server 330.
- Application server 306 performs the function of secure data server 328 storing secure data 328A. For example, application server 306 stores secure data 328A and application 308. In another example, application 308 is integrated with secure data 328A, such that accessing application 308 provides access to secure data 328A within application 308.
- Authentication server 330 performs the function of computing device 310 storing blockchain 312.
- Authentication server 330 performs the function of secure data server 328 storing secure data 328A.
- Authentication server 330 performs the function of wallet memory device node 320 storing digital wallet dataset 322 of one or more electronic wallets. Each electronic wallet may store one or more of: the IUT identifier, the defined IUT including the IUT identifier, the wallet address, the unique name of the wallet, the private key and/or unique password used to create the IUT identifier. Each electronic wallet is associated with a wallet address, which may be mapped (e.g., by mapping dataset 330B) to the IUT identifier and/or IUT (including the IUT identifier) and/or to the digital representation of the genetic sequence.
- Computing device 310 performs the function of wallet storage device 320 storing digital wallet dataset 322.
- Computing device 310 performs the function of application server 306.
- Computing device 310 performs the function of authentication server 330.

Each device and/or server 304, 330, 306, 310, 320, 326 and/or 328 may be implemented as, for example, a mobile device, a stationary device, a desktop computer, a server, a smartphone, a laptop, a tablet computer, a wearable computing device, a glasses computing device, a watch computing device, a computing cloud, a virtual machine, and a virtual server.

Each device and/or server 304, 330, 306, 310, 320, 326 and/or 328 includes a respective processor 332A-G that executes respective code stored in a respective memory 336A-G (and/or other data storage device). Processor(s) 332A-G may be implemented as, for example, central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 332A-G may be implemented as a single processor, a multi-core processor, and/or a cluster of processors arranged for parallel processing (which may include homogenous and/or heterogeneous processor architectures).

Respective memories 336A-G may be implemented as, for example, a hard drive, a random access memory (RAM), read-only memory (ROM), an optical drive, an external storage device, and/or other storage devices. It is noted that processor(s) 332A-G may be designed to implement in hardware one or more features that would otherwise be stored as code instructions by respective memories 336A-G.

One or more device and/or server 304, 330, 306, 310, 320, 326 and/or 328 may include a respective data storage device 338A-G that stores data, for example, application 308, blockchain 312, and/or digital wallet dataset 322, as described herein. Data storage devices 338A-G may be implemented as, for example, a random access memory (RAM), read-only memory (ROM), non-volatile memory, magnetic media, semiconductor memory devices, hard drive, removable storage, optical media (e.g., DVD, CD-ROM), a remote storage server, and a computing cloud. It is noted that some data and/or code may be stored in respective data storage devices with executable portions loaded into respective memories.

Network 302 may be implemented, for example, as one or more of: a wire based network (e.g., Ethernet), a wireless based network, the internet, a local area network, a wide area network, a virtual private network, a virtual network, a cellular network, a short range wireless network, a mesh network, and an ad-hoc network. Network 302 may be implemented using one or more protocols and/or network architectures.

One or more device and/or server 304, 330, 306, 310, 320, 326 and/or 328 may include respective user interfaces 340A-G that presents data to a user and/or includes a mechanism for entry of data, for example, one or more of: a touch-screen, a display, a keyboard, a mouse, voice activated software, and a microphone.

Each device and/or server 304, 330, 306, 310, 320, 326 and/or 328 includes a respective network interface 342A-G for communicating with network 302, for example, physical and/or virtual components, for example, one or more of, antenna(s), network interface card(s), a wire port, a virtual interface implemented in software, network communication software providing higher layers of network connectivity, an application programming interface (API), a software development kit (SDK), and/or other implementations.

Referring now back to FIG. 1, at 102, a biological sample of the user is provided for creating the digital representation of the genetic sequence of the user. The genetic sequence is obtained from the biological sample provided by the sample individual, for example sequenced by a sequencing machine. Alternatively, an existing digital representation is provided, for example, stored in an electronic medical record of the user, and/or obtained from another biological sample provided by the user for other reasons, such as to screen for genetic mutations.

The digital representation of the genetic sequence is stored in a genetic sequence record (e.g., 314) stored in a block of a publicly accessible blockchain (e.g., 312) stored on a blockchain network node (e.g., 310) in communication with the network. The genetic sequence record is provided to one or more additional network nodes each storing respective copies of the blockchain storing genetic sequence records of genetic sequences of users. Each network node locally updates its respective copy of the blockchain, according to blockchain updating protocols. Once the digital representation of the genetic sequence of the user is stored in multiple copies by multiple blockchains, the genetic sequence is practically immutable, tamper-proof, and secure.

Optionally, the digital representation is of an encrypted, optionally hashed, genetic sequence of the user. The digital representation is mapped to the IUT. The IUT may be associated to a wallet address of an electronic wallet stored on a wallet memory in communication with the network. The mapping may be stored by mapping dataset 330B.

The genetic sequence record may be mapped to the IUT and/or to a public address of an electronic wallet of the user, and/or to the wallet address and/or to the unique name of the wallet, optionally stored as digital wallet dataset 322 in wallet memory 320 and/or stored in mapping dataset 330B. The IUT may be mapped to the wallet address of the electronic wallet. The public address of the electronic wallet and/or the wallet address and/or to the unique name of the wallet may be stored in a field of the blockchain block storing the digital representation of the genetic sequence of the user, for example, indicating that the owner of the genetic sequence is according to the public address of the electronic wallet and/or according to the wallet address and/or to the unique name of the wallet.

The digital representation of the genetic sequence may be added to the blockchain, for example, according to instructions generated by sequencing server 326 that provides the digital representation of the genetic sequence.

The public address of the electronic wallet and/or the wallet address and/or the unique name of the wallet may be provided, for example, in association with the biological sample, for example, as a label of a container storing the biological sample, as described herein. In another example, the public address of the electronic wallet and/or the wallet address and/or the unique name of the wallet is provided by the user, for example, via a graphical user interface associated with the sequencing server 326 in which the user enters a code indication of the digital representation of the genetic sequence (e.g., code on a container of the biological sample) and the public address of the wallet and/or the wallet address and/or the unique name of the wallet, to map the public address of the wallet and/or the wallet address and/or the unique name of the wallet, to the digital representation of the genetic sequence. It is noted that the public address of the wallet and/or the wallet address and/or the unique name of the wallet, may be a secure address available to a limited defined number of entities, for example, when the wallet is stored on a private network accessible to the defined entities. In such a case, the public address and/or the wallet address and/or the unique name of the wallet, is only available on the private network, in a sense being public only to the entities allowed to access the private network.

The genetic sequence stored in the blockchain may be the entire genetic sequence of the user (e.g. DNA), or portions of the DNA, for example, multiple defined distinct CODIS alleles. A larger number of CODIS alleles may be stored, where a subset of the CODIS alleles is selected for creation of the IUT identifier, for example, 20 CODIS where 13 are selected for creation of the IUT identifier. During some password reset implementations different CODIS may be used (i.e., a different combination of 13 out of 20 CODIS), providing a new genetic sequence from the same user DNA, as described herein.

An exemplary kit for providing the biological sample and a code indicative of the public wallet is described with reference to FIG. 9 below.

Figure 4:
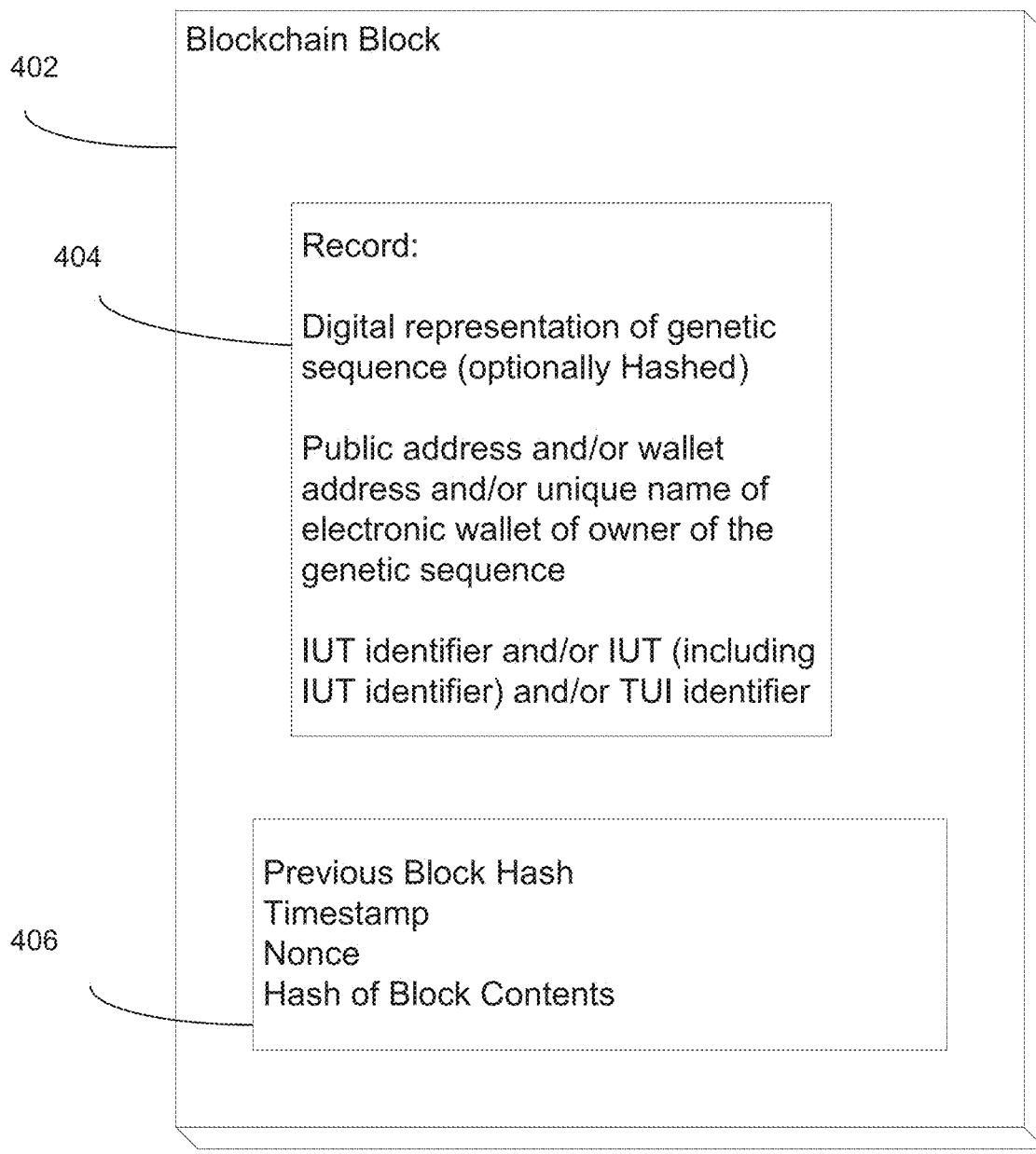
FIG. 4 is a schematic of an exemplary block of the blockchain dataset storing digital representation of genetic sequences and/or IUTs, in accordance with some embodiments of the present invention.

Reference is now made to FIG. 4, which is a schematic of an exemplary block 402 of the blockchain dataset (e.g., blockchain 312) storing digital representation of genetic sequences (e.g., 314) and/or IUTs, in accordance with some embodiments of the present invention. Block 402 includes a record field 404, optionally storing a genetic sequence record. Record field 404 stores one or more of:

The digital representation of the genetic of the user, optionally encrypted for example, hashed.

An indication of the owner of the digital representation of the genetic sequence, for example, the wallet address (e.g., public address) of the electronic wallet of the owner (e.g., where the IUT created based on the selected subset of the digital representation of the genetic sequence is stored, and/or where the unique password and/or private key used to create the IUT identifier is stored) and/or the wallet address and/or the unique name of the wallet.

IUT identifier and/or IUT (including the IUT identifier), defined as described herein.

TUI identifier stored as metadata of a transaction record.

Each block 402 may store records for a single user, or for multiple users.

A Block header 406 stores data according to the implementation of the block chain, for example, the hash of the previous block in the chain, the hash of the current block, a nonce, and a timestamp.

Referring now back to FIG. 1, at 104, applications are registered for performing authentication using the IUT (and/or TUI) described herein. Registered application may be stored in an application dataset (e.g., dataset 330A stored by authentication server(s) 330) storing a respective authentication indication for each authenticated application that is authenticated to obtain an authentication indication indicative of the authenticated user from the authentication server.

The registration of the applications may help ensure malicious applications do not attempt to hijack the authentication process, for example, by registering the redirect URI (uniform resource identifier) upon completion of the authentication of the user.

Applications registering with application dataset may be stored, for example, as applications 308 by respective application servers 306.

Registration may be performed, for example, automatically by the applications, manually by developers of the applications, by the user of the application, and/or by authentication server in response to requests for authentication of users received from applications. In another example, the registration of the application is triggered in response to a request for authentication by a user to access the application.

For registration, the application may be provide one or more parameters, for example, an identity of the application (e.g., name, ID), URL, description, and/or callback (e.g., redirect) mechanism to return from the authentication process. The callback mechanism may be implemented as, for example, a callback URI, HTTP request, telnet, SSH, or other protocols.

Figure 5:
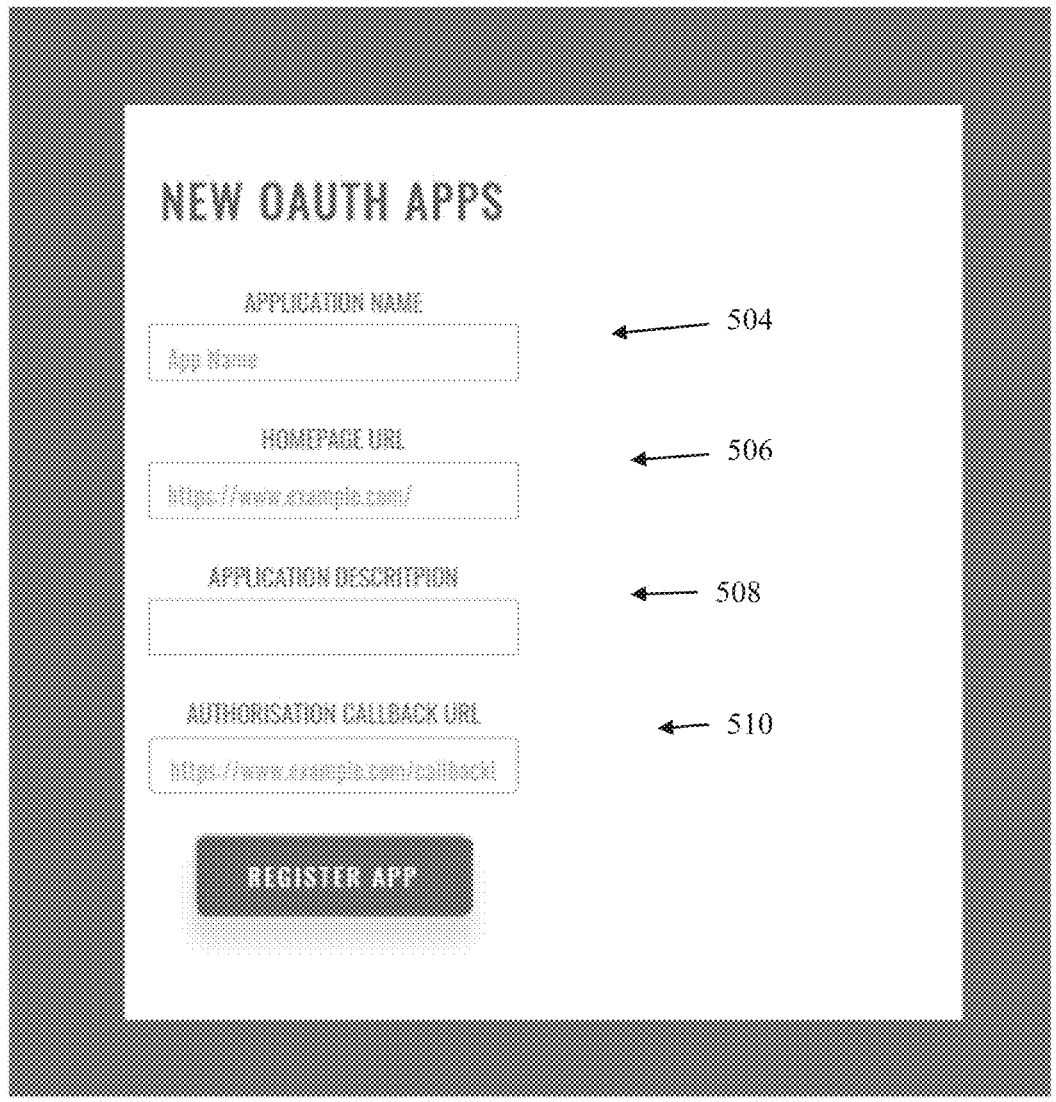
FIG. 5 is a schematic of an exemplary GUI for registration of an application for authentication of a user based on an IUT, in accordance with some embodiments of the present invention.

Reference is now made to FIG. 5, which is a schematic of an exemplary GUI 502 for registration of an application for authentication of a user based on an IUT, in accordance with some embodiments of the present invention. The application is registered by providing one or more of: application name 504, homepage URL 506, application description 508, and authorization callback URL 510. The registered application may be stored in the application dataset, as described herein.

Referring now back to FIG. 1, at 106, an IUT identifier is defined and stored in an IUT. Alternatively or additionally, the TUI identifier is defined and stored in the transaction record of the blockchain.

The IUT identifier may be defined for an existing IUT obtained from a pool of available unique IUTs, for example, provided by smart contract code. Alternatively, the IUT identifier is defined for a newly created unique IUT.

The TUI identifier is stored in a transaction record of a blockchain dataset.

Optionally, a private key linked to a public address of an electronic wallet is obtained over a network from a client terminal.

Optionally, the unique name serving as a substitute for the wallet address is obtained, for example, over the network from the client terminal. The unique name (i.e., the wallet address) is associate with the private key and the public address of the wallet.

The IUT identifier is an outcome (e.g., output of a computation) of encrypting (e.g., hashing, such as 256 hash) a subset of the hashed digital representation and a unique password. The unique password may be provided by the user during defining of the IUT identifier. The unique password may be obtained from the wallet of the user according to the wallet address of the user. The unique password may be a private key linked to the public address of the electronic wallet of the user and/or the wallet address and/or the unique name of the wallet.

Optionally, the IUT is stored in a genetic sequence record stored in a block of a blockchain dataset accessible via the network. The genetic sequence record may be mapped to the IUT, and optionally the IUT may be associated to the wallet address.

Optionally, the IUT identifier is defined for the user based on the selected subset of the digital representation of the genetic sequence of the user, and according to the unique password (e.g., private key). The IUT identifier may be stored in the wallet of the user, according to the address of the wallet memory. The address of the wallet may be stored in the blockchain in association with the digital representation of the genetic sequence, and/or in the mapping dataset. The IUT identifier may be stored in another computing device according to a user provided value such as a network address.

Optionally, the IUT identifier is defined by IUT code 316 implemented as a smart contract code stored by the blockchain and executed by processor(s) of the computing device 310, for example, IUT blockchain network node.

The IUT identifier may be defined upon request by a user, for example, a use that uses a client terminal e.g., 304) to access IUT code 316 (e.g., using a web browser over a network). The IUT storing the IUT identifier may be generated and/or selected from a pool of predefined IUTs upon the request by the user.

The IUT identifier and/or IUT is used for authentication of the user, as described herein.

The IUT storing the IUT identifier is implemented as a non-fungible token (NFT). NFTs are unique cryptographic assets that each represent a non-interchangeable token. The NFT may be defined by a protocol, for example, Ethereum ERC721, and/or ERC994, and/or ERC223, and/or for example, a NEO protocol such as NEP-5.

The IUT is defined according to a defined subset of genetic sequence, for example, a defined set of CODIS alleles. A different set of genetic sequences, such as CODIS alleles, may be selected when a password reset is performed.

Optionally, the DNA sequences that are used to define the IUT identifier are STRs that are not included in the list of 13 or 20 CODIS described above but rather on a list of 10-50 other STRs that are used in combination to determine the unique identity of a human being compared to another individual.

Optionally, the DNA sequences that are used to define the IUT identifier are not STRs but rather unique DNA or RNA sequences that are used in combination to determine the unique identity of a human being compared to another individual. For example, a combination selected from: sequences of the human leukocyte antigen (HLA) system, and/or a gene complex encoding the major histocompatibility complex (MHC) proteins. For example, sequences of the Complementarity-determining regions (CDRs) that are part of the variable chains in immunoglobulins (antibodies) and T cell receptors, generated by B-cells and T-cells respectively.

Additional details of defining the IUT identifier are described with reference to FIG. 2A below.

Figure 6:
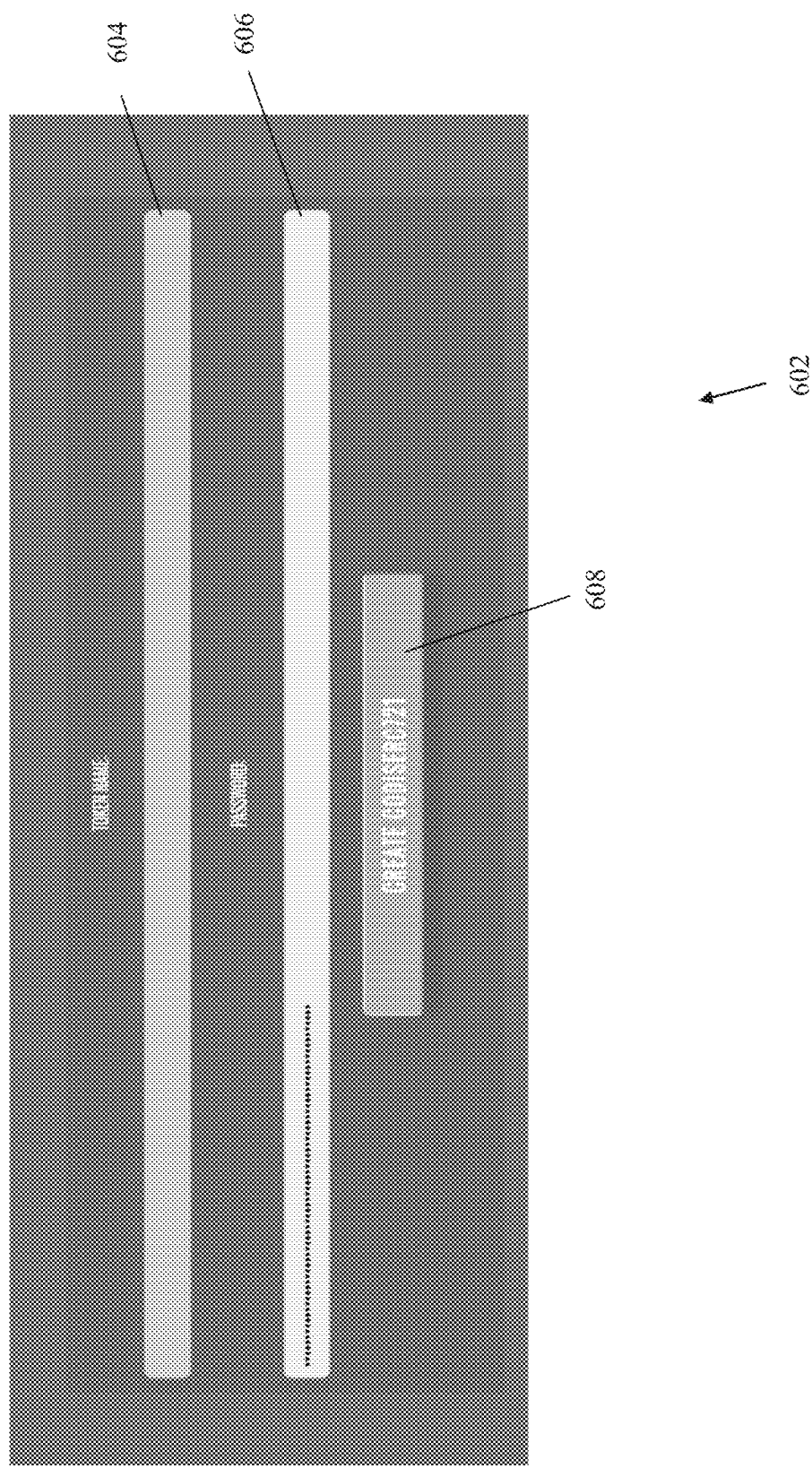
FIG. 6 is a schematic of an exemplary GUI for creating and/or storing and/or defining the IUT, in accordance with some embodiments of the present invention.

Reference is now made to FIG. 6, which is a schematic of an exemplary GUI 602 for creating and/or storing and/or defining the IUT, in accordance with some embodiments of the present invention. In field 604, the user enters the public address of the electronic wallet (e.g., network address) and/or the wallet address and/or the unique name of the wallet. The IUT may be accessed for authentication via the public address of the wallet and/or the wallet address and/or the unique name of the wallet. The public address of the wallet and/or the wallet address and/or the unique name of the wallet may be provided as a network address, and/or as a username (e.g., selected by the user) that is mapped to the network address of the wallet. In password field 606, the user enters the unique password. The unique password may be, for example, a password defined by the user, and/or a private key of the electronic wallet that may be linked to the public address of the wallet and/or the wallet address and/or the unique name of the wallet. The IUT identifier is created and/or defined and/or stored in response to selecting (e.g., clicking) on icon 608. The IUT identifier is stored in the IUT. The IUT including IUT identifier is stored as described herein.

Figure 7:
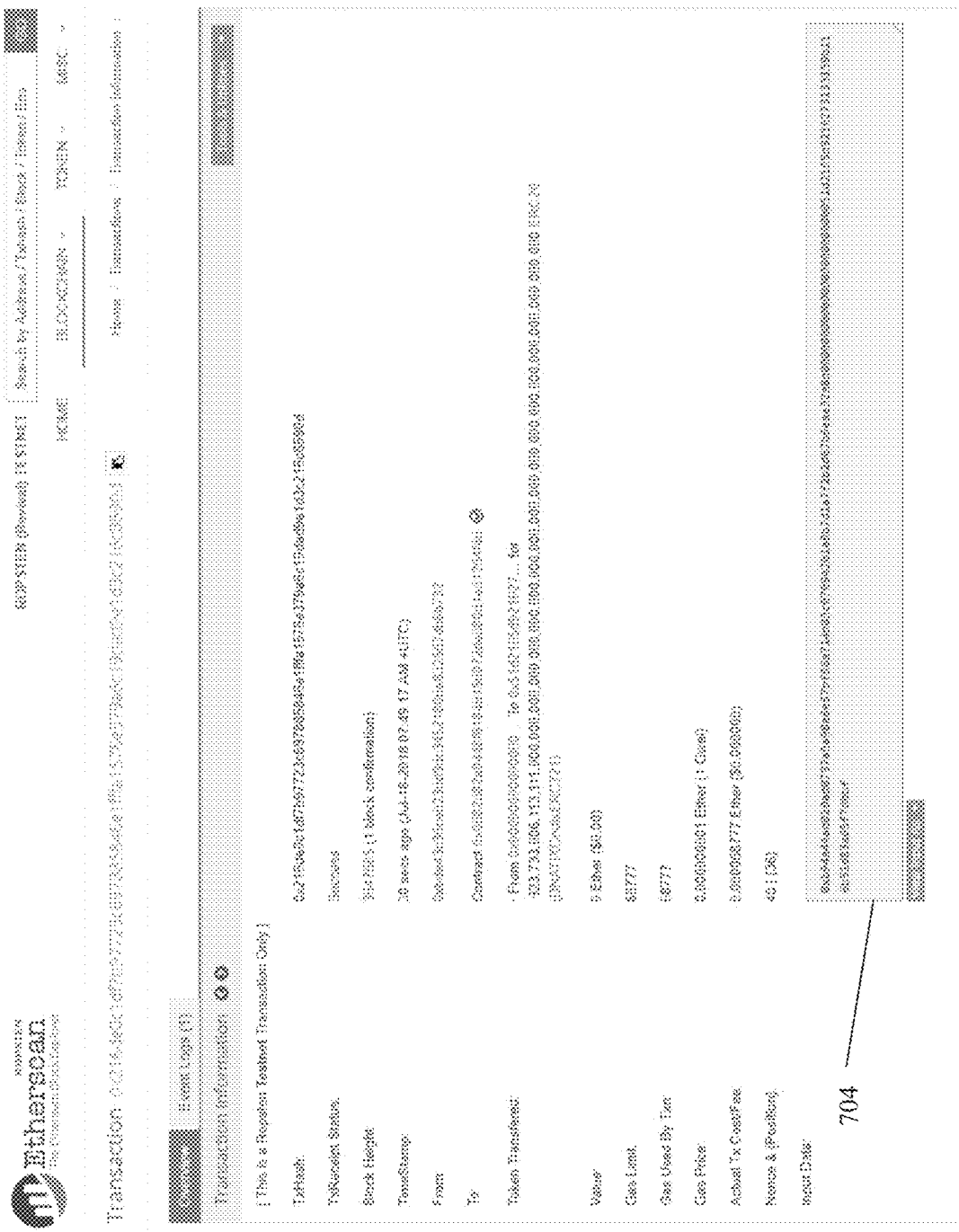
FIG. 7 is a schematic of an exemplary GUI depicting an exemplary created and/or stored and/or defined IUT, in accordance with some embodiments of the present invention.

Reference is now made to FIG. 7, which is a schematic of an exemplary GUI depicting an exemplary created and/or stored and/or defined IUT 702, in accordance with some embodiments of the present invention. IUT 702 includes IUT identifier 704. IUT identifier 704 is an outcome of encryption (e.g., hashing) a subset of the (optionally hashed) digital representation of the genetic sequence and the unique password (e.g., private key), as described herein. Other fields of the IUT 702 may be based on the selected implementation platform.

Referring now back to FIG. 1, at 108, a user is authenticated for accessing an application according to a combination of an authentication value computed according to a user provided wallet address (or unique name denoting the wallet address) and/or user provided address of the transaction record storing the TUI, and/or the selected subset of the digital representation of the genetic sequence stored in the blockchain. The authentication may be performed by authentication server 330 for accessing application 308 stored by application server 306. The authenticated user may access secure data 328A stored on secure data server 328 via application 308.

The user is authenticated when a match is identified between the TUI identifier and/or IUT identifier stored in the blockchain, and an authentication value computed according to a user provided password and a user provided wallet address (or unique name denoting the wallet address). In the case of TUI identifier an address of the transaction record storing the TUI may be provided instead of and/or in addition to the wallet address. The wallet address (and/or address of the transaction record) may be used to obtain the selected subset of the digital representation of the genetic sequence stored in the blockchain and/or the wallet address may be used to obtain the TUI identifier. The user may enter the IUT identifier and/or address of the , for example, manually entering into a GUI presented on a display asking for the IUT identifier to provide authentication, and/or automatically obtained from the wallet of the user according to the wallet address.

The user provided wallet address (or unique name denoting the wallet address) may denote the address of the defined cryptographic non-fungible IUT. The IUT identifier may be obtained from the IUT according to the user provided wallet address (or unique name denoting the wallet address). Alternatively or additionally, the subset of the digital representation of the genetic sequence of the user may be obtained according to the user provided wallet address, for example, the subset of the digital representation of the genetic sequence is stored in the wallet associated with the wallet address, and/or the subset of the digital representation of the genetic sequence is stored on the blockchain in association with the wallet address (e.g., the blockchain block storing the subset of the digital representation of the genetic sequence includes a field identifying the wallet address, and/or the wallet includes a field storing the address of the blockchain block storing the subset). The user may be authenticated when the value stored in the IUT identifier (i.e., the encryption (optionally hashing) of the encrypted (optionally hashed) subset of the digital representation of the genetic sequence of the user and the unique password of the user) matches the authentication value computed based on encryption of the encrypted subset of the digital representation of the genetic sequence of the user obtained from the blockchain according to the user provided wallet address (or unique name denoting the wallet address), and a user provided password. The user may enter the user provided password and/or the wallet address (and/or the unique name denoting the wallet address) via the GUI presented on the display asking for the password for authentication of the user.

The authentication may be performed when the IUT identifier stored on the blockchain (e.g., extracted from the electronic wallet of the user, from the matching dataset, and/or from the genetic sequence record of the blockchain dataset) matches an authentication value computed according to a user provided password and the user provided wallet address. The user provided wallet address is used to obtain the IUT identifier and/or to obtain the selected subset of the digital representation of the genetic sequence obtained from the blockchain. The indication of the selected subset of the genetic sequence may be obtained, for example, from the wallet of the user according to the public address and/or according to the wallet address and/or provided by the user, and/or from the wallet of the user accessed by the private key, and/or from the matching dataset optionally according to the public address of the wallet of the user and/or the wallet address and/or the unique name of the wallet. The selected subset of the digital representation of the genetic sequence of the user may be obtained from the blockchain according to a field of the blockchain storing the public address of the electronic wallet of the user and/or the wallet address and/or the unique name of the wallet. The authentication value may be computed according to the encryption protocol that computed the IUT identifier, for example, a hash function. The authentication value may be computed by IUT code and/or other code that executes the protocol, optionally by smart contract code of the blockchain.

The authentication of the user according to the IUT (e.g., the IUT identifier stored in the IUT) may be integrated with existing authentication protocols, by adding additional features to the authentication protocols. For example, the initial authentication of the user using client terminal 304 to access application 308 may be implemented based on the IUT, as described herein. Transfer of secure data 328A from secure data server 328 to client terminal 304 via application 308 may be performed using existing authentication protocols.

An authentication protocol is a computer communication protocol or cryptographic protocol that is designed for the purpose of transferring of authentication data between two entities. It allows the receiving entity to authenticate the connecting entity or authenticate itself to the connecting entity (Client connecting to a Server and/or Server to a client respectively) by defining the type of information needed for authentication as well as syntax. See for example, Duncan, Richard (23 Oct. 2001). "*An Overview of Different Authentication Methods and Protocols*". www(dot)sans(dot)org. *SANS Institute.* Retrieved 31 Oct. 2015. The authentication protocols is the most important layer of protection needed for secure communication within computer networks.

Different authentication processes have been created. For example, the OAUTH2.0 protocol is the de-facto standard of authentication systems used by small apps as well as the largest enterprises. An example of integrating authentication based on the IUT with the OAUTH 2.0 protocol is described with reference to FIG. 10.

Authentication with the IUT, as described herein, may be integrated with other authentication protocols, for example, developed for PPP Point-to-Point Protocol such as PAP—Password Authentication Protocol, CHAP—Challenge-handshake authentication protocol or EAP—Extensible Authentication Protocol. Authentication protocol could be AAA architecture protocols (Authentication, Authorization, Accounting) including but not limited to TACACS, XTACACS and TACACS+, RADIUS, DIAMETER. Other authentication protocols could be Kerberos (protocol), AKA, CAVE-based authentication, CRAM-MD5, Digest, Host Identity Protocol (HIP), LAN Manager, NTLM, also known as NT, LAN Manager, OpenID protocol, Password-authenticated key agreement protocols, Protocol for Carrying Authentication for Network Access (PANA), Secure Remote Password protocol (SRP), RFID-Authentication Protocols, Woo Lam 92 (protocol), SAML Additional details of an exemplary process for authentication the user according to IUT is described with reference to FIG. 2B.

At 110, a reset request for resetting the IUT and/or TUI identifier may be provided, for example, to authentication server 330 and/or IUT creation blockchain network node 310. The reset request may be provided by the user, and/or issued by code. The reset request may be triggered, for example, when the private key has been lost and the user cannot access the wallet, when the public key has been lost, and/or suspicious that the IUT has been compromised by a malicious party.

Another IUT identifier, optionally of another IUT is computed based on the unique password (e.g., when not lost) or based on a new unique password (e.g., when lost), and according to the same subset of the digital representation of the genetic sequence of the user (used to compute the previous IUT) or according to another (optionally hashed) selected subset of the digital representation of another genetic sequence of the user. Alternatively, the same IUT is used, by replacing the previous IUT identifier with the new IUT identifier. In implementations in which a new subset is selected, the other digital representation of the other genetic sequence is obtained from a portion of DNA of the user that is different than the original genetic sequence used to create the original IUT. For example, a different set of CODIS are used, which may or may not overlap with the original CODIS set. The new IUT and/or new IUT identifier may be stored, for example, in the matching dataset, in the genetic sequence record in the blockchain, and/or in the electronic wallet optionally according to the public address of the wallet (when available) and/or the wallet address and/or the unique name of the wallet, and/or stored in a new wallet according to a new public wallet address (e.g., when the original wallet has been compromised and/or the public password has been lost).

Additional details of an exemplary process for resetting the IUT is described with reference to FIG. 2C.

Alternatively, the password of the user may be restored and/or reset, without creating a new IUT and optionally without discarding the previous IUT. The password of the user may be restored and/or reset using available password restoration and/or reset processes. The password of the user may be restored and/or reset in response to, for example, the user forgetting the password.

At 112, the user may be authenticated multiple times using the IUT identifier and/or IUT including the IUT identifier, by iterating the features described with reference to act 108. Optionally, when the IUT and/or password is reset, the user may be authenticated multiple times using the new IUT identifier and/or new IUT including new IUT identifier.

Referring now back to FIG. 2A, the process described with reference to FIG. 2A may be implemented by components of system 300 described with reference to FIG. 3, for example, by hardware processor(s) of computing device 310 executing IUT code 316 stored in a data storage device, and optionally implemented as smart contract code stored in association with the blockchain 312 storing records of digital representations of genetic sequences of users 314.

At 202, a digital representation of a genetic sequence of a user is obtained. The digital representation may be of an encrypted genetic sequence, for example, hashed.

The digital representation of the genetic sequence is stored in a genetic sequence record stored in a block of a (optionally publicly accessible) blockchain dataset (e.g., stored on a blockchain network node) in communication with the network, as described herein. Optionally, the genetic sequence record is mapped to the IUT and/or to the public address of the electronic wallet and/or the wallet address and/or the unique name of the wallet. The IUT may be mapped to the wallet address of the electronic wallet.

The digital representation may be obtained automatically by IUT code in response to a user issuing a request to generate and/or define the IUT identifier. The digital representation may be obtained from the blockchain according to the address of the wallet of the user that appears as a field in the record of the blockchain indicating the owner of the stored digital representation of the genetic sequence, for example, according to the mapping dataset. The user may manually provide the address of the wallet, and/or the address of the genetic sequence in the blockchain. In another implementation, the address of the wallet and/or the address of the blockchain block storing the genetic sequence is mapped to user credentials (e.g., username and/or password), for example, once the user logs in using the user credentials, the address of the wallet and/or address of the genetic sequence in the blockchain is obtained from a dataset that maps between user credentials and wallet addresses and/or addresses of records of genetic sequences stored in the blockchain.

An exemplary digital representation of the genetic sequence is based a combination of on one or more of: multiple short tandem repeats (STR) of DNA of the user, one or more CODIS of the DNA of the user, sequences of the human leukocyte antigen (HLA) system, and gene complexes encoding the major histocompatibility complex (MHC) proteins.

At 204, a public address of an electronic wallet of the user and/or the wallet address and/or the unique name of the wallet, stored on a wallet memory in communication with the network is obtained. The electronic wallet is associated with the obtained digital representation of the (optionally hashed) genetic sequence. The wallet address of the electronic wallet may be obtained, for example, manually entered by the user, obtained from a dataset that maps between user credentials and public addresses of electronic wallets and/or the wallet address and/or the unique name of the wallet, and/or obtained from a code provided by a kit for providing the biological sample (e.g., the code is scanned by a camera of a mobile device of the user). Scanning the code may automatically trigger creation of the wallet. Uploading the genetic sequence by the sequencing server may trigger definition of the IUT identifier.

At 206, a unique password of the user is obtained. The unique password may be a private key linked to the public address of the electronic wallet and/or to the wallet address and/or to the unique name of the wallet, and/or the unique password may be a user selected password. The unique password may be provided by the user, for example, by manually entering the password via a user interface of a client terminal into a GUI, by scanning a code provided with the kit described herein. The private key may be used to access the contents of the electronic wallet, for example, to withdraw the IUT. The password may be automatically provided, for example, stored in a safe storage device (e.g., on the client terminal of the user).

The password may be selected by a user, for example, upon registering for definition of IUTs. The user may register, for example, as described herein.

At 207, a subset of the genetic sequence is selected. The subset may selected as a combination from a set of candidate genetic sequences, for example, a combination of a predefined number of short tandem repeats (STR) of DNA of the user selected from candidate STR, a combination of a predefined number of CODIS alleles of the DNA of the user selected from candidate CODIS alleles (e.g., select 13 out of 20 CODIS alleles), a combination of a predefined number of sequences of the human leukocyte antigen (HLA) system selected from candidate HLA sequences, and a combination of a predefined number of gene complexes encoding the major histocompatibility complex (MHC) proteins selected from candidate MHC protein gene complexes.

The selection may be performed, for example, randomly, manually by the user, and/or according to a sequential list of predefined selections (i.e., each IUT of the user is generated according to the current position in the list).

An indication of the selected subset of the genetic sequence, optionally the selected candidates used in the combination, may be stored, for example, in the electronic wallet of the user according to the public key, and/or as a field of the created IUT, in the genetic sequence record of the blockchain, and/or in the matching dataset.

At 208, the IUT identifier is determined (e.g., computed) as an outcome of an encryption (e.g., hashing) of the selected subset of the (optionally hashed) digital representation of the genetic sequence and the unique password. The IUT identifier may be computed, for example, based on a mathematical hash function that receives as input the selected subset of the (optionally hashed) digital representation of the genetic sequence and to the unique password. Optionally, the IUT is a cryptographic non-fungible token.

Optionally, the IUT is selected from a pool of pre-created unique IUTs by smart contract code executed on the blockchain. The IUT identifier of the selected IUT is defined, as described herein. Alternatively, the IUT is generated as a unique token by the smart contract code.

Optionally, the IUT is based on predefined protocol(s), for example, Ethereum® protocols ERC 721, ERC 994, and/or ERC223.

Optionally, a value of the IUT is zero in all cyptocurrencies.

At 210, the IUT is stored in the genetic sequence record stored in a block of the blockchain dataset accessible via the network. The genetic sequence record is mapped to the IUT, and optionally the IUT is associated to the wallet address. Alternatively or additionally, the IUT and/or IUT identifier is stored in the electronic wallet of the user (e.g., according to the public address of the wallet and/or according to the wallet address and/or according to the unique name of the wallet). Alternatively or additionally, the IUT and/or IUT identifier is stored in the matching dataset.

At 212, a record indicative of a transaction of transfer of the IUT (e.g., to the electronic wallet, blockchain, and/or matching dataset) is created and stored. The transaction record may include a field indicating the address of the storage device where the IUT was transmitted to (i.e., destination), and a field indicating the address of the smart contract code that created the IUT (i.e., origination). The transaction record may include a field indicating the value of zero for the value of the IUT.

The transaction record may be stored, for example, in the block of the publicly accessible blockchain storing the digital representation of the genetic sequence, and/or in a block of a Mainnet publicly accessible blockchain storing transactions for generated IUTs of different users.

Figure 8:
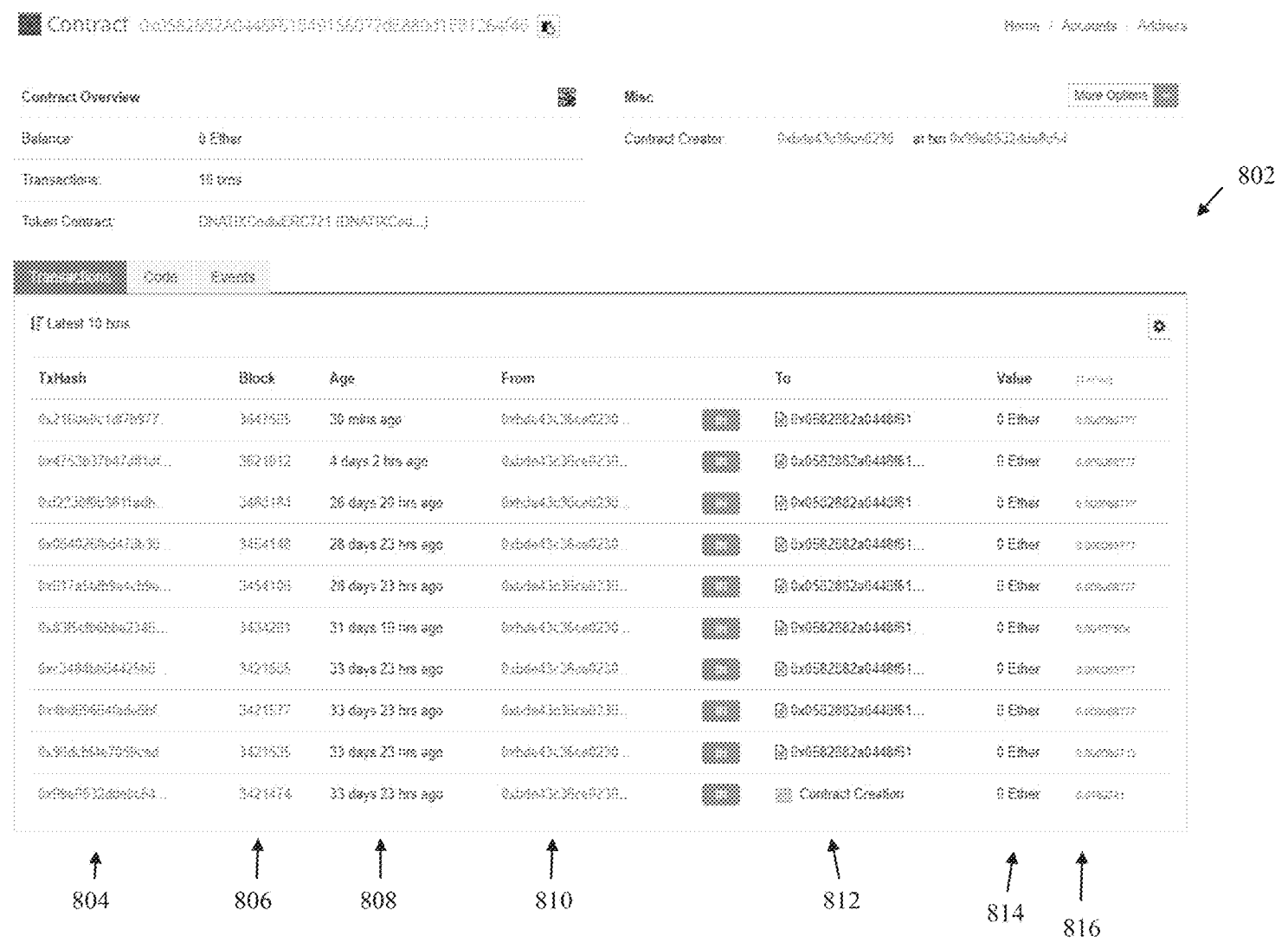

Reference is now made to FIG. 8, which is an example of a GUI 802 presenting a list of transactions for created and/or stored and/or defined IUTs, in accordance with some embodiments of the present invention. Each transaction may include, the transmission ID of the created IUT (e.g., TxHash) 804, block of the blockchain storing the digital representation of the genetic sequence used to create the IUT 806, Age of the IUT 808, From field 808 storing the address of the IUT creation smartcode, To field 810 storing the address of the wallet to which the IUT is transferred, Value field 812 storing the cryptocurrency value of the IUT (usually set to zero), and optionally a transfer fee field 814 denoting the cost for creating and/or transferring the IUT.

Referring now back to FIG. 2A, at 214, the user is authenticated, for example, by smart contract code executing in associated with a blockchain dataset in communication with the network. The authentication may be triggered, for example, by an authentication server such as for authentication of a user for accessing an application and/or sensitive data, by an application which may be stored on an application server for access by the user, and/or by the user via a client terminal such as within a session.

The user is authenticated when a match is identified between the IUT identifier stored on the blockchain, and an authentication value computed according to a user provided password and a user provided wallet address. The wallet address is used to obtain the IUT identifier used to compute the authentication value and/or to obtain the selected subset of the digital representation of the genetic sequence stored in the blockchain for computation of the authentication value. Additional details of authentication of the user are described with reference to act 108 of FIG. 1 and/or with reference to FIG. 2B.

Referring back to FIG. 2B, the process described with reference to FIG. 2B may be implemented by components of system 300 described with reference to FIG. 3, for example, by hardware processor(s) of a server executing code stored in a data storage, such as smart contract code associated with a blockchain dataset. Authentication may be triggered be triggered, for example, by an authentication server such as for authentication of a user for accessing an application and/or sensitive data, by an application which may be stored on an application server for access by the user, and/or by the user via a client terminal such as within a session.

At 252, a request message for authentication of a user is received. The request may be for authentication of the user for accessing an application stored on an application server. The request may be received by the authentication server, optionally by smart contract code executed by hardware processor(s) of the authentication server. The request may be generated by the client terminal of the user (e.g., for authentication within a session) and/or by the application server hosting the application the user is attempting to access and/or by the authentication server.

The request may include a wallet address of an electronic wallet stored on a wallet memory in communication with a network.

The request may include a user provided wallet address (or unique name denoting the wallet address), optionally implemented as an address of the IUT (previously defined by the user), or a private key linked to the public address of the electronic wallet and/or to the wallet address and/or to the unique name of the wallet.

The request may include an indication of the selected subset of the digital representation of the genetic sequence of the user, optionally the combination of candidates, for example, which of the 20 candidate CODIS alleles to user and/or in which order to access the CODIS alleles. Alternatively, the indication of the selected subset of the digital representation of the genetic sequence of the user is automatically obtained, for example, from the wallet of the user according to the private key and/or public key and/or wallet address and/or unique name, for example, the indication may be stored in the wallet requiring the public key to find the wallet on the network and the private key to extract the indication from the wallet.

The electronic wallet and/or the private key and/or wallet address and/or unique name may be provided, for example, manually entered by the user (e.g., via a GUI presented on a display of the client terminal) and/or obtained from a dataset that maps between user credentials and addresses of wallets and/or private keys and/or unique names (e.g., in response to the user logging in with the credentials).

Optionally, the request for authentication is received over the network via a callback mechanism issued by the application that the user is attempting to access that is executing on an application server. The callback mechanism may be implemented as, for example, a callback URI, HTTP request, telnet, SSH, or other protocols.

Optionally, the request for authentication further includes application credential(s) for authentication of the application by the authentication server. The application may be authenticated based on the application dataset described herein, for example, with reference to act 104 of FIG. 1.

At 254, the user provided password and public address of an electronic wallet (or unique name denoting the wallet address) is obtained. The user provided wallet address (or unique name denoting the wallet address) and/or the user password may be obtained from the request and/or manually entered by the user and/or obtained from the dataset that maps between user credentials and private keys, as described with reference to act 252.

The user provided wallet address (or unique name denoting the wallet address) may denote address of the defined cryptographic non-fungible IUT storing the IUT identifier. The IUT identifier may be obtained from the IUT according to the user provided wallet address (or unique name denoting the wallet address) (i.e., address of the IUT). The user is authenticated when the value stored in the IUT identifier (i.e., the encryption (optionally hashing) of the encrypted (optionally hashed) subset of the digital representation of the genetic sequence of the user and the unique password of the user) matches the authentication value computed based on encryption of the encrypted subset of the digital representation of the genetic sequence of the user obtained from the blockchain according to the user provided wallet address (or unique name denoting the wallet address), and a user provided password.

At 256, a token address and/or the IUT identifier stored in the IUT (of the user) is obtained. The token address denotes a non-fungible token address, for example, ERC721 address which is indicative of the smart contract on the blockchain of the ERC721 protocol standard.

At 258, the IUT is obtained from a genetic sequence record stored in a block of a blockchain.

Optionally, a selected subset of the (optionally hashed) digital representation of a genetic sequence of the user stored in a genetic sequence record of a block of a blockchain is obtained. The selected subset of the digital representation of the genetic sequence is obtained according to the public address of the electronic wallet and/or the wallet address and/or the unique name of the wallet, mapped to the genetic sequence record, and optionally according to the indication of the selected subset of a digital representation of a genetic sequence of the user. For example, the blocks of the blockchain are searched to identify a block where a field indicating the owner of the stored genetic sequence matches the public address of the electronic wallet and/or the wallet address and/or the unique name of the wallet.

Respective copies of the blockchain storing genetic sequence records of genetic sequences of users are stored on multiple network nodes. The authentication server obtains the digital representation of the genetic sequence from one of the copies of the blockchain stored by one of the network nodes. The authentication server may act as a network node that locally stores a copy of the blockchain.

At 259, an indication of an authentication of the user is generated. The authentication may be for accessing the application. The authentication is generated when a match between a computed value of the user provided password and the wallet address provided by the request, and the IUT identifier stored on the genetic sequence record stored on the block chain.

The authentication value may be computed by an IUT computation function (implemented as code stored on a data storage device, for execution by processor(s) that computes the authentication value according to the same protocol used to compute the IUT. For example, based on a mathematical hash function that receives as input the selected subset of the digital representation of the genetic sequence (which may be obtained based on a mapping to the IUT having the address denoted by the user provided wallet address (or unique name denoting the wallet address)) and a user provided password (e.g., manually entered by a user via the GUI). The authentication value may be computed by the IUT code (e.g., implemented as smart contract code executed on the blockchain storing the genetic sequences of users) and/or by other code that performs the same function stored on another device (e.g., stored by the authentication server).

The generated indication of the authentication of the user is provided over the network to the application and/or to the authentication server and/or to the client terminal of the user (e.g., to the session of the user) in response to the request, optionally via the callback mechanism. The callback mechanism may be obtained from the application dataset. The callback mechanism may be implemented as, for example, a callback URI, HTTP request, telnet, SSH, or other protocols.

Optionally, additional steps are executed as part of another authentication process, when authentication based on IUT is integrated with another authentication process, for example, as described with reference to FIG. 10.

The user may be granted access to the application upon successful authentication.

Referring now back to FIG. 2C, it is noted that the term 'second' refers to 'another', subsequent to the 'original' or 'previous'. When the method is iterated multiple times, 'second' refers to the 'current' phase, which may actually be the third or more iterations. For example, the second IUT may be the third created IUT, or more.

At 270, a reset request for resetting the IUT is received. The request may be received in response to a lost private key, and/or likelihood of tampering with the IUT, and/or a security breach to the private key and/or IUT. The request may be received, for example, manually by the user, and/or automatically by code (e.g., upon detecting a possible security breach).

Optionally, the geographical location of the client terminal providing the reset request and/or providing the new unique password (as described with reference to act 274) is verified. Password reset may be performed upon successful verification of the geographical location. When the geographical location is not verified, password reset is not performed. For example, a message may be presented on a display of the client terminal instructing the user of the client terminal to be located at the previous location used to create the previous IUT. The verification of the geographical location provides an additional layer of security, for example, preventing or reducing risk of password resets being performed by malicious entities remotely located in other countries and/or other geographical locations.

The verification is performed when a match is identified between a new (i.e., current) geographical location of the client terminal providing the reset request and/or the new unique password, and a previous geographical location of the client terminal (optionally the same client terminal, or another client terminal) that triggered creation of the previous IUT. The geographical locations may be obtained, for example, automatically from a GPS device installed in the client terminal, from a cellular and/or wireless network provider that computes the location of the client terminal (e.g., using triangular methods), and/or manually entered by a user. The previous geographical location may be stored, optionally encrypted, for example, in the wallet of the user, in the previous IUT, in the blockchain, associated with the genetic sequence, in the mapping dataset, and/or in a geographical location dataset.

The match may be determined when the new geographical location and the previous geographical location are within a same defined geographical location region, for example, within the same defined geographical coordinate boundary (e.g., 3 kilometer diameter circle), the same city, the same street, the same building, and the same country.

It is noted that the verification of geographic location may be executed, for example, after any other one of acts, or other suitable features of the process. It is noted that the verification of geographic location may be executed, for example, in association with the process for defining the IUT and/or TUI and/or in association with the process for authentication the user based on the IUT and/or TUI, as described with reference to FIGS. 1, 2A, 2B, and/or 2D.

At 272, the subset of the digital representation of the genetic sequence of the user is obtained, for example, as described herein. The digital representation of the same subset of the genetic sequence of the user used for the previous IUT may be used to define the new IUT.

Alternatively or additionally, a second subset of the digital representation of the genetic sequence of the user may selected. The term the second subset may refer to both implementation, in which the same subset representation is used and/or in which another subset is selected.

In implementations in which another subset is selected, the second selected subset of the digital representation is different than the previous subset. Optionally, the combination of candidates of the second subset is different than the combination of candidates of the previous subset. For example, a different combination of 13 CODIS alleles is selected from the set of 20 candidate CODIS alleles. The selection is performed as described with reference to act 207 of FIG. 2A.

Optionally, when the previous subset of the digital representation of the genetic sequence of the user is used, the authenticity of the previous subset is verified. The user may be instructed to provide another biological sample, for example, via a kit, as described herein. The new genetic sequence may be uploaded to the blockchain, as described herein with reference to the original genetic sequence.

A new version of the subset of the hashed digital representation of the genetic sequence of the user is provided. The new version of the subset of the hashed digital representation of the genetic sequence of the user is compared with the previous hashed digital representation of the genetic sequence of the user. A match denotes authenticity of the subset, and the process may continue. When not match is found, the user may be provided with an error message, and/or an indication of possible malicious activity may be generated.

At 273, a second unique password (e.g., user selected password, private key of electronic wallet) may be provided, for example, when the previous unique password is lost and/or due to likelihood of a security breach. Alternatively, the previous unique password is used. The second unique password may be provided, for example, as described with reference to act 206 of FIG. 2A.

At 274, a second IUT identifier and/or second IUT is defined and/or created and/or computed based on the unique password (optionally the new unique password) and the second subset of the digital representation of the genetic sequence of the user. The second IUT identifier and/or second IUT is defined as described herein, for example, with reference to act 208 of FIG. 2A and/or act 106 of FIG. 1.

The second IUT identifier may replace the previous IUT identifier in the same IUT (which was used previously, but referred to as second IUT for clarity). Alternatively, a new IUT is selected to replace the previous. The new second IUT identifier is defined for the new IUT.

Optionally, the second IUT and/or second IUT identifier is designated as active. The previous IUT and/or previous IUT identifier may be designated as deactivated (e.g., in implementations in which the previous IUT and/or previous IUT identifier cannot be deleted or adjusted such as being stored on the blockchain) or deleted and/or destroyed (e.g., in implementations in which the previous IUT and/or IUT identifier may be deleted or adjusted).

At 276, a second wallet may be created. The second wallet may be created, for example, when the private key of the previous wallet is lost and/or there is likelihood of a security breach of the private key of previous wallet. The public address and/or the wallet address and/or the unique name of the second wallet may be mapped to the genetic sequence and/or to the second IUT, as described herein. The second wallet may be assigned a second wallet address and optionally a second unique name substituting for the second wallet address. The second wallet address is associated with the private key and the public address of the second wallet. The private key and the public address of the second wallet is associated to a wallet address of the second wallet, optionally associated with a unique name of the second wallet.

At 277, the second IUT including the second IUT identifier is stored in the genetic sequence record stored in the block of the blockchain dataset. The genetic sequence record is mapped to the second IUT, and optionally the second IUT is associated to the wallet address. Alternatively or additionally, the second IUT and/or second IUT identifier is stored in the matching dataset, and/or stored in the second electronic wallet of the user (when created) or in the original wallet (when the second wallet is not created) according to the public address and/or the wallet address and/or the unique name of the respective wallet, for example, as described with reference to act 210 of FIG. 2A. Optionally, an indication of the second subset of the digital representation of the genetic sequence of the user is stored in the wallet and/or blockchain block record and/or matching dataset, optionally as a field of the second IUT.

Optionally, the previous IUT is removed (e.g., transferred to a 'junk' location), deleted, and/or otherwise tagged as invalid. Alternatively, the previous IUT is unaffected, for example, when the new IUT is stored, and/or when the private key for the previous wallet is lost such that access to the wallet cannot be obtained.

At 278, a record indicating the transaction of transfer of the second IUT to the storage location is created and stored, for example, as described herein with reference to act 212 of FIG. 2A.

At 279, the user is authenticated according to the second IUT, for example, as described herein with reference to act 214 of FIG. 2A, and/or FIG. 2B and/or act 108 of FIG. 1. The user may be authenticated by a match between the second IUT identifier stored on the blockchain and a second value computed according to a user provided second wallet address and a user provided second password.

Referring now back to FIG. 2D, at 292, a digital representation of a (optionally encrypted, for example, hashed) genetic sequence of a user is provided. The digital representation is stored on a computing device in communication with a network. Additional details of the digital representation of the genetic sequence of the user are found, for example, as described herein.

At 293, a wallet address of an electronic wallet is provided, for example, as described herein.

At 294, a unique password of a user is provided, for example, as described herein.

At 295, a subset of the genetic sequence is selected, for example, as described herein.

At 296, the TUI is defined based on the selected subset of the digital representation of the genetic sequence and the unique password. The TUI is optionally stored as metadata of the transaction. The TUI identifier is an outcome of hashing the subset of the hashed digital representation and the unique password. Additional details are found for example, as described herein.

At 298, a record, storing the TUI, indicative of a unique transaction, is stored in a server and/or in a smart contract of the blockchain dataset accessible via the network. The TUI may be accessed according to an address of the transaction record.

Additional details are found for example, as described herein.

At 299, the user is authenticated based on the TUI. The user may be authenticated by a match between the TUI identifier (e.g., obtained according to a user provided address of the transaction record or a user provided wallet address), and an authentication value. The authentication value is computed according to a user provided password and the selected subset of the digital representation of the genetic sequence stored in the blockchain.

Figure 9:
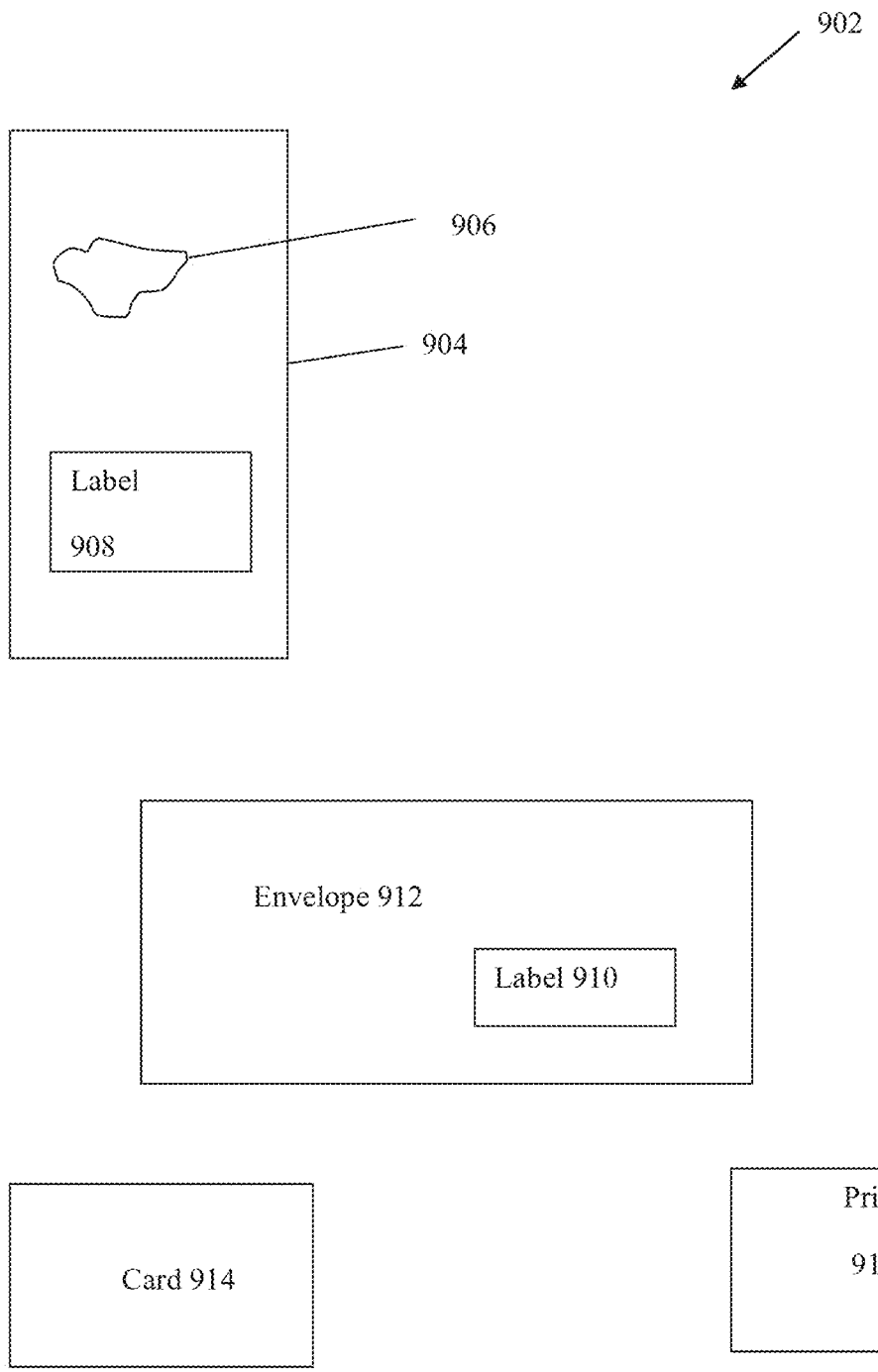
FIG. 9 is a schematic of a kit for creating and/or storing and/or defining an IUT for a user for authentication of the user, according to a genetic sequence of the user stored on a blockchain, in accordance with some embodiments of the present invention.

Reference is now made to FIG. 9, which is a schematic of a kit 902 for creating and/or storing and/or defining an identify unique token (IUT) for a user for network authentication of the user, according to a genetic sequence of the user stored on a blockchain, in accordance with some embodiments of the present invention.

Kit 902 includes a genetic data container 904 for storing a biological sample 906 of the user. The biological sample 906 includes genetic sequence(s), for example, saliva, buccal sample, blood sample, hair, and skin scraping.

Kit 908 includes an indication of a wallet address (e.g., public network address) of an electronic wallet stored on a wallet memory in communication with a network. The wallet address may be implemented as, for example, a code, which may be scannable (e.g., quick response (QR) code, bar code) and/or manually enterable into an interface (e.g., into a GUI), such as a sequence of characters (e.g., letters, numbers, symbols). Scannable code may be printed on the label. Indications may be randomly created. The indication may be hidden by non-reversible hidden mechanism that is removed by the user that obtained kit 908, for example, a user scratches a coating to reveal the indication of the wallet address of the electronic wallet. Hiding the indication provides another layer of security, in that the manufacturer of the kit and/or intermediaries handling the kit are unaware of which kit is assigned which code. Scannable code may be scanned by an imaging sensor of a client terminal, for example, by a camera of a mobile phone, and/or by a laser scanner at a laboratory where the genetic sequence is obtained from the biological sample. The indication (e.g., code) may be provided as a label stuck on to container 904 such that label is separate from container 904. In another example, the indication is provided as a label (e.g., code) 910 on an envelope 912 which may be pre-addressed to the sequencing center that creates the digital representation of the genetic sequence. In another example, the indication is provided as a physical object 914 such as a card, for storage by the user.

Optionally, kit 902 includes an indication of a unique password 916, for example, a private key of the electronic wallet that may be linked to the public address and/or the wallet address and/or the unique name of the electronic wallet, for example, a code. The private key and the public address are associated with a wallet address, which may be associated with a unique name, optionally selected by the user. Unique password 916 is used to define the IUT identifier as described herein. Unique password 916 may correspond to the public network address of the electronic wallet, acting as the private key for accessing the wallet. Password 916 may be stored on card 914, and/or on a different card. Password 916 may be printed on paper, which is destroyed after password 916 is scanned by a mobile device of the user. Alternatively or additionally, password 916 is changed by the user. Alternatively, when no password 916 is provided in kit 902, the user may create the password, for example, by entering the password into a GUI when the wallet is created and/or when the IUT identifier is defined.

Optionally, the electronic wallet is automatically created when the indication is entered, for example, entered into a GUI, and/or provided to the IUT code (e.g., 316). The electronic wallet may be automatically created in response to scanning of the scannable code by the imaging sensor (e.g., camera) of a mobile device of the user. Alternatively, in response to scanning of the scannable code, an address of a preexisting wallet may be provided, for example, manually entered by the user into a GUI. The wallet may be automatically created when no existing wallet is provided.

The digital representation of the genetic sequence extracted from the biological sample of the user may be stored by a genetic sequence record in a block of a blockchain, as described herein. The genetic sequence record may be mapped to the IUT and/or to public network address of the electronic wallet, as described herein. The IUT may be mapped to the wallet address of the electronic wallet, as described herein.

The IUT indication may be defined and/or computed by execution of smart contract code associated with the blockchain, as described herein. The IUT indication may be defined and/or generated according to the selected subset of the digital representation of the genetic sequence stored in the genetic sequence record and according to a user provided wallet address (or unique name denoting the wallet address), as described herein. The IUT including IUT identifier may be stored, for example, in one or more of: a genetic sequence record in a block of a blockchain dataset, in the matching dataset, and/or in the electronic wallet, optionally according to the public network address of the electronic wallet mapped to the respective storage location, as described herein.

Kit 902 may be obtained, for example, purchased in a store, and/or ordered online and provided by mail.

Figure 10:
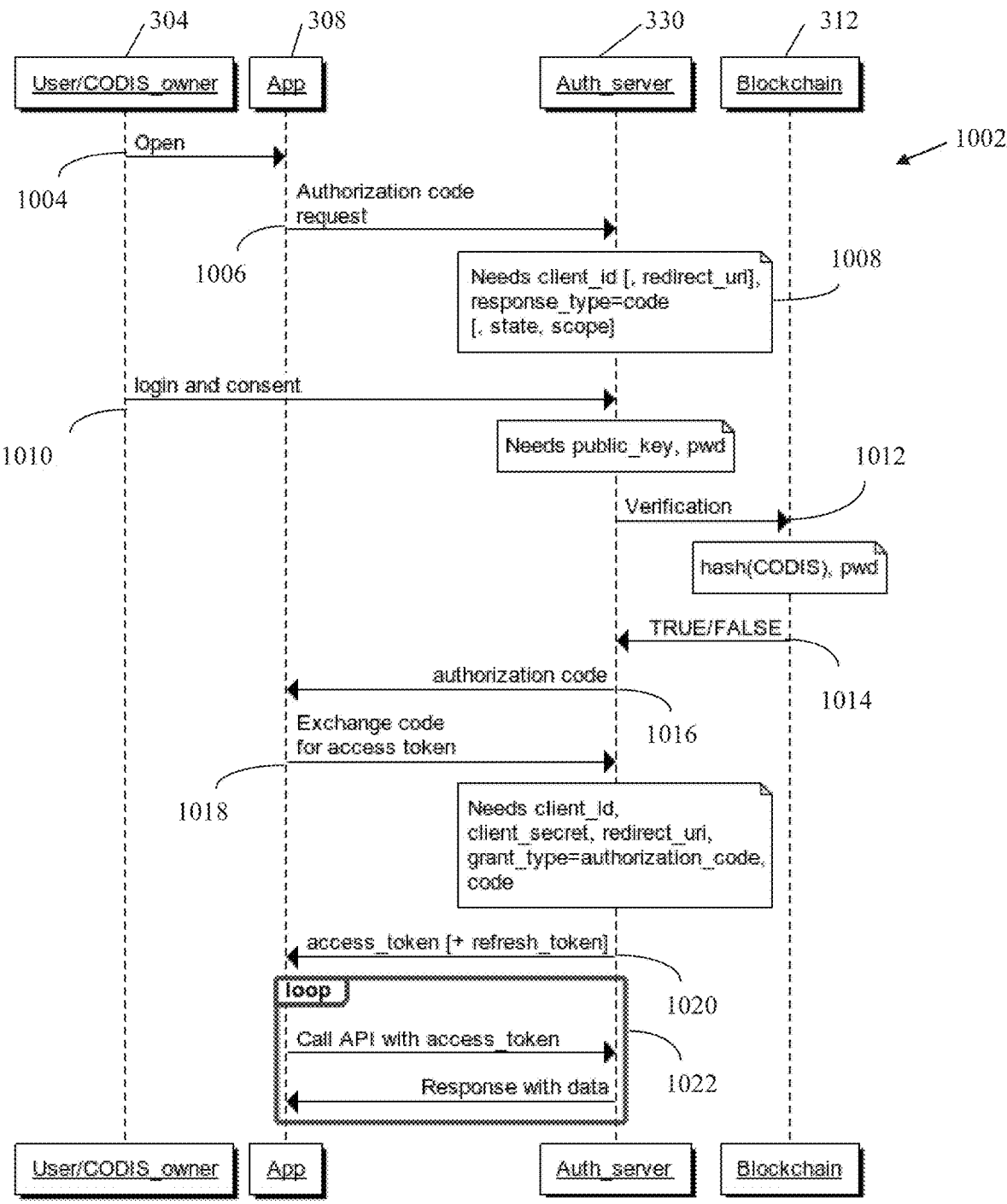
FIG. 10 is a schematic of an exemplary dataflow depicting integration of authentication of the user according to the created and/or stored and/or defined IUT with an existing authentication protocol, in accordance with some embodiments of the present invention.

Reference is now made to FIG. 10, which is a schematic of an exemplary dataflow 1002 depicting integration of authentication of the user according to the created and/or stored and/or defined IUT with an existing authentication protocol, in accordance with some embodiments of the present invention. Dataflow 1002 is described with reference to OUATH2.0 as an example, but is to be understood that dataflow 1002 is applicable to other authentication protocols. Dataflow 1002 is based on features described with reference to FIGS. 1, 2A, 2B, 2C, and/or 4-9, and/or 11-12, implementable by components of system 300 described with reference to FIG. 3.

At 1004, application 308 receives an access request from client terminal 304 of a user. The user may click on an icon "Sign in with IUT" (or other similar message) that may appear on the GUI of applicant 308 presented on a display of client terminal 304.

At 1006, a redirection is performed to authentication server 330, for example, a pop-up GUI appears on the display of client terminal 304.

At 1008, the pop-up GUI may presents an approval dialog with information about application 308, for example, the name of the application and/or the application logo. The information about application 308 may be obtained from application dataset 330A At 1010, the user enters the public address and/or the wallet address and/or the unique name of the electronic wallet (e.g., public key, such as user selected username and/or user ID) and user provided wallet address (or unique name denoting the wallet address).

At 1012, authentication server 330 accesses blockchain 312 to obtain the selected subset of the digital representation of the genetic sequence, and computes the authentication value using the user provided password and user provided wallet address (or unique name) used to obtain the IUT identifier and/or the selected subset of the digital representation of the genetic sequence, as described herein.

At 1014, the authentication value is compared to the IUT identifier to determine whether a match is identified (i.e., TRUE) or not (i.e., FALSE). The IUT identifier may be obtained, for example, from the genetic sequence of the blockchain, from the wallet of the user The pop-up closes, and the client terminal 304 of the user is redirected back to application 308.

At 1016, application 308 is provided with cryptographic proof indicative of authentication of the user.

At 1018, authentication server 330 receives from application 308 a request for an access token for accessing a protected resource (e.g., secure data 328A), in response to the indication of the authentication of the user.

At 1020, authentication server 330 provides the access token to the application 308 in response to the request for the access token.

At 1022, the access token is obtained from the application 308. The protected resource (e.g., secure data 328A) is provided over the network to the application 308 in response to the access token. 1022 is iterated until the session is terminated.

It is noted that 1018-1022 are described with reference to the OUATH2.0. However is it noted that other existing authentication protocols may be used to transfer secure data 328A to client terminal 304 via application 308.

Figure 11:
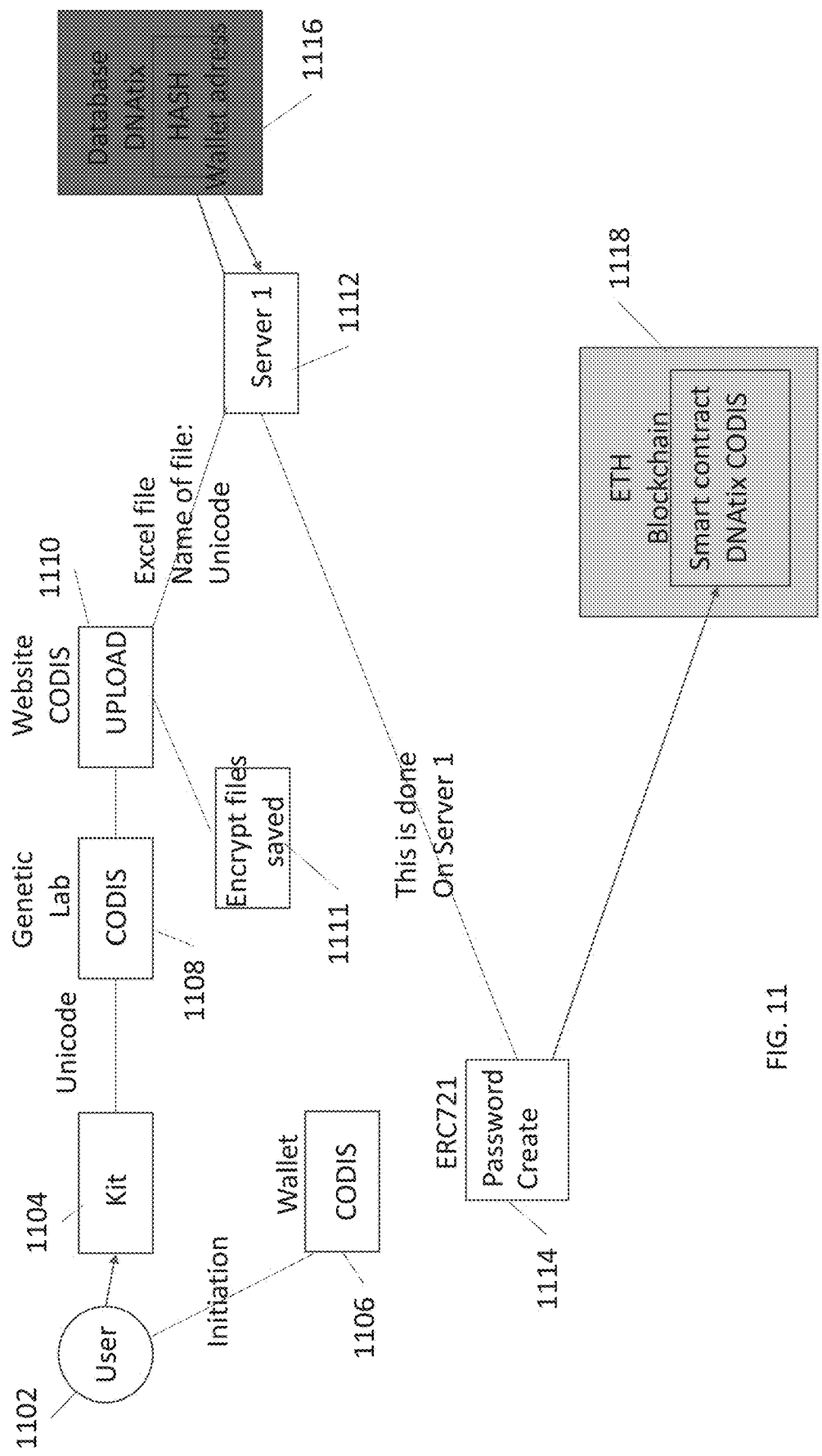
FIG. 11 is a schematic of an exemplary dataflow for creating and/or storing and/or defining a non-fungible IUT based on at least part of a genetic sequence of a user, for network authentication of the user, in accordance with some embodiments of the present invention.

Reference is now made to FIG. 11, which is a schematic of an exemplary dataflow for creating and/or storing and/or defining a non-fungible IUT based on at least part of a genetic sequence of a user, for network authentication of the user, in accordance with some embodiments of the present invention. The dataflow described with reference to FIG. 11 may be implemented by components of system 300 described with reference to FIG. 3, and/or may include and/or may be based on features described with reference to one or more of FIGS. 1, 2A-2C, and 4-10. A user 1102 obtains a kit 1104 for obtaining a biological sample for genetic sequencing thereof, as described herein. A wallet 1106 stored in a wallet memory and associated with a wallet address may be created based on kit 1104, and/or a pre-existing wallet 1106 may be used, as described herein. A computing device in a genetic lab 1108 creates a digital representation of the genetic sequence. The digital representation of the genetic sequence is provided to a computing device, optionally website 1110. The digital representation of the genetic sequence may be encrypted, for example hashed, optionally by website 1110, to create hashed digital representation (i.e., encrypted saved files) 1111. Wallet 1106 may store the (optionally hashed) digital representation of the genetic sequence. The hashed digital representation of the genetic sequence may be provided to a server 1112, for example, as a Unicode file. The hashed digital representation of the genetic sequence may be stored in a genetic sequence record stored in a block of a blockchain dataset 1118.

Server 1112 computes a HASH (also referred to herein as IUT identifier) as an outcome of a hashing of the subset of hashed digital representation and a unique password. The unique password may be new password provided by the user, or a private key associated with the wallet (i.e., linked to the public key of the wallet, which may be the public address and/or the wallet address and/or the unique name of the electronic wallet). The IUT identifier may be stored in an IUT provided by smart contract code 1114 that stores unique non fungible IUTs. For example, the smart contract code provides (e.g., selects) a certain IUT from the set of available IUTs. Smart contract code 1114 may generate the IUT identifier as an outcome of an encryption (e.g., hashing, such as 256 hash) of the subset of the hashed digital representation and the unique password and/or the private key of the wallet address. Smart contract code 1114 may be stored and/or executed by server 1112. The HASH (i.e., IUT identifier) is mapped to the wallet address (e.g., owned by the same user that provided the biological sample for creating the digital representation of the genetic sequence) and stored in a dataset 1116. Dataset 1116 may store mappings between the HASH (i.e., IUT identifier) and/or IUT and the genetic sequence record stored in block of blockchain dataset 1118. The created HASH (i.e., IUT identifier) and/or IUT (which includes the IUT identifier) may be stored in blockchain dataset 1118. The HASH (i.e., IUT identifier) and/or IUT (which includes the IUT identifier) may be stored in a genetic sequence record stored in a block of blockchain dataset 1118. The mapping between the HASH (i.e., IUT identifier) and/or IUT (which includes the IUT identifier) may be stored by dataset 1116.

Optionally, the dataflow described with reference to FIG. 11 is executed according to one or more validation processes. For example, the validation of the digital representation of the genetic sequence is performed prior to further processing (e.g., hashing and computation of the IUT identifier). Exemplary validation of the digital representation of the genetic sequence includes: checking if another equal digital representation of the genetic sequence does not already exists, checking if the digital representation of the genetic sequence is stored according to a defined format (e.g., certain file type), checking if the digital representation of the genetic sequence includes defined sequences (e.g., predefined CODIS sequences). For example, validation prior to creation and/or defining the IUT includes: checking whether the provided digital representation of the genetic sequence is encrypted (e.g., hashed), checking whether fees have been paid such as for execution of the smart contract code, checking whether a unique password has been provided, and checking whether the computed HASH (i.e., IUT identifier) is unique.

Figure 12:
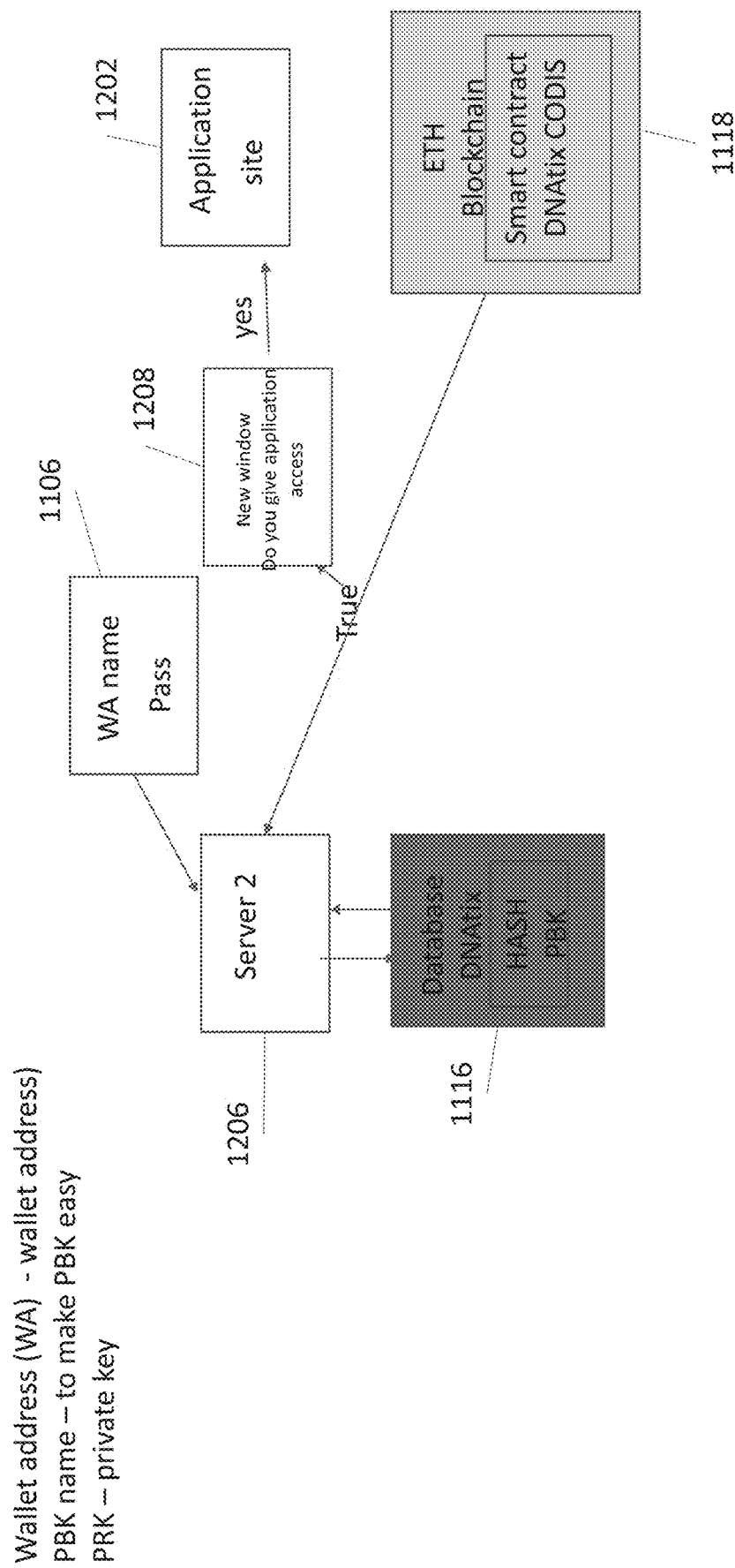
FIG. 12 is a schematic of an exemplary dataflow for authenticating a user for accessing an application based on a non-fungible IUT based on at least part of a genetic sequence of a user, in accordance with some embodiments of the present invention.

Reference is now made to FIG. 12, which is a schematic of an exemplary dataflow for authenticating a user for accessing an application 1202 based on a non-fungible IUT based on at least part of a genetic sequence of a user, in accordance with some embodiments of the present invention. The dataflow described with reference to FIG. 12 may be implemented by components of system 300 described with reference to FIG. 3, and/or may include and/or may be based on features described with reference to one or more of FIGS. 1, 2A-2C, and 4-11.

Server 1204, optionally implemented as an authentication server, obtains a user provided wallet address (or unique name denoting the wallet address). IUT identifier may be stored in a wallet memory 1206 associated with a wallet address. Server 1204 may obtain the IUT identifier (e.g., private key and/or unique password) from wallet memory 1206 according to the provided wallet address. Server 1206 computes an authentication value (e.g., a hash) according to a user provided password and the user provided wallet address (or unique name denoting the wallet address) used to obtain the IUT identifier computed according to a subset of a digital representation of the genetic sequence stored in blockchain 1118. The mapping between the user provided wallet address (or unique name denoting the wallet address) and the subset of the digital representation of the genetic sequence stored in blockchain 1118 may be stored by dataset 1116. Dataset 116 may store IUT identifiers and/or IUTs (which include the IUT identifiers). Dataset 116 may store hashed digital representation of genetic sequences. Server 1204 authenticates the user when a match is found between the IUT identifier stored on the blockchain, the authentication value computed according to the user provided password and the user provided wallet address (or unique name) used to obtain the subset of the digital representation of the genetic sequence stored in blockchain 1118 and/or used to obtain the IUT identifier for computation of the authentication value. The user may be granted authentication to access application 1202. Access to application 1202 may be performed based on another process 1208 that grants the access in response to receiving the authentication of the user from server 1204.

Optionally, the dataflow described with reference to FIG. 12 is executed according to one or more validation processes. For example, the existence of the wallet is verified according to the wallet address, the existence of an IUT for the user is verified, and ownership of the IUT by the user is verified.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant blockchain architectures and NFT will be developed and the scope of the term blockchain and NFT is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A kit for creating an identity unique token (IUT) or transaction unique identity (TUI) for a user for network authentication of the user, comprising:
   a genetic data container for storing a biological sample of the user that includes at least one genetic sequence;
   an indication of a unique code associated to a wallet address;
   wherein an IUT identifier is stored in a cryptographic non-fungible IUT, the IUT identifier is an outcome of hashing a subset of a hashed digital representation of the biological sample and a unique password, the IUT is stored in a genetic sequence record stored in a block of a blockchain dataset accessible via the network, wherein the genetic sequence record is associated with the IUT, the IUT is associated to the wallet address, or wherein a TUI identifier is stored as metadata of a transaction record of a block of a blockchain dataset accessible via the network according to an address, the TUI identifier is an outcome of hashing the subset of the hashed digital representation and the unique password,
   wherein the user is authenticated by a match between a computed value of a password and the wallet address provided by the user, and the IUT identifier stored on the blockchain, or wherein the user is authenticated by a match between the TUI identifier obtained according to a user provided address of the transaction record or a user provided wallet address, and a value computed according to a user provided password and the subset of the digital representation of the genetic sequence stored in the blockchain.

2. The kit of claim 1, further comprising an indication of a unique password for accessing an electronic wallet associated with the wallet address.

3. The kit of claim 1, wherein the wallet address is encoded into a physical scannable code for scanning by an imaging sensor of a client terminal.

4. The kit of claim 3, wherein an electronic wallet associated with the wallet address is automatically created when the physical scannable code is scanned by the imaging sensor.

5. The kit of claim 1, wherein the indication of the wallet address is hidden by a non-reversible hidden mechanism that is removed by the user.

6. The kit of claim 3, wherein an address of a preexisting wallet is provided in response to scanning of the physical scannable code.

7. A system for creating a transaction unique identity (TUI) identifier based on at least part of a genetic sequence of a user for network authentication of the user, comprising:
   a non-transitory memory having stored thereon a code;
   at least one hardware processor adapted to execute the code for:
      obtaining a digital representation of a hashed genetic sequence of a user, the digital representation obtained via a network;
      computing the TUI identifier, the TUI identifier is an outcome of hashing a subset of the hashed digital representation and a unique password;
      storing the TUI identifier as metadata of a transaction record of a block of a blockchain dataset accessible via the network according to the address;
   wherein the user is authenticated by a match between the TUI identifier obtained according to a user provided address of the transaction record or a user provided wallet address, and an authentication value computed according to a user provided password and the subset of the digital representation of the genetic sequence stored in the blockchain.

* * * * *